(12) United States Patent
Manning et al.

(10) Patent No.: US 12,620,003 B2
(45) Date of Patent: **\*May 5, 2026**

(54) VISUAL INDICATION PRESENTATION AND INTERACTION PROCESSING SYSTEMS AND METHODS

(71) Applicant: KOCHAVA INC., Sandpoint, ID (US)

(72) Inventors: Charles F. Manning, Sandpoint, ID (US); Tyler McKinley, West Linn, OR (US); Ethan Lewis, Sandpoint, ID (US)

(73) Assignee: KOCHAVA INC., Sandpoint, ID (US)

( \* ) Notice: Subject to any disclaimer, the term of this patent is extended or adjusted under 35 U.S.C. 154(b) by 289 days.

This patent is subject to a terminal disclaimer.

(21) Appl. No.: 18/209,097

(22) Filed: Jun. 13, 2023

(65) Prior Publication Data

US 2023/0325879 A1 Oct. 12, 2023

Related U.S. Application Data

(63) Continuation of application No. 17/392,351, filed on Aug. 3, 2021, now Pat. No. 11,720,921.

(Continued)

(51) Int. Cl.
G06Q 30/0251 (2023.01)
G06Q 30/0241 (2023.01)

(52) U.S. Cl.
CPC ..... G06Q 30/0256 (2013.01); G06Q 30/0253 (2013.01); G06Q 30/0269 (2013.01); G06Q 30/0277 (2013.01)

(58) Field of Classification Search
CPC ........... G06Q 30/0256; G06Q 30/0253; G06Q 30/0269; G06Q 30/0277

(Continued)

(56) References Cited

U.S. PATENT DOCUMENTS

| 6,895,438 B1 | 5/2005 | Ulrich | |
| 7,969,606 B2 * | 6/2011 | Chu ..................... | H04N 1/3873 |
| | | | 358/1.18 |

(Continued)

FOREIGN PATENT DOCUMENTS

| AU | 2019100273 A4 | 5/2019 |
| CN | 1737923 A | 2/2006 |

(Continued)

OTHER PUBLICATIONS

Bethany K. Hansen, An evaluation of video cameras for collecting observational data on sanctuary-housed chimpanzees, 2018 (Year: 2018).*

(Continued)

*Primary Examiner* — Tarek Elchanti
(74) *Attorney, Agent, or Firm* — ROSSI, KIMMS & McDOWELL LLP

(57) ABSTRACT

A data processing device system may be configured by a program at least to determine particular content associated with a first indication of observable presentation of the visual indicator received from a first device system; store in response to determining that the particular content is associated with the received first indication, a recorded-presentation indication indicating that the particular content or information associated therewith has been device-presented; determine that the particular content is associated with a second indication of a user interaction with the visual indicator received from a second device system; and store in response to determining that the particular content is associated with the received second indication, an indication that the particular content has been interacted with by a user.

14 Claims, 7 Drawing Sheets

Related U.S. Application Data

(60) Provisional application No. 63/065,009, filed on Aug. 13, 2020.

(58) Field of Classification Search
USPC .......... 705/14.54, 14.49; 358/1.18; 382/103; 463/43; 713/153
See application file for complete search history.

(56) References Cited

U.S. PATENT DOCUMENTS

| | | | |
|---|---|---|---|
| 8,457,352 B2* | 6/2013 | Hennessey | G06F 3/013 382/103 |
| 10,127,577 B2 | 11/2018 | Santi | |
| 2001/0023457 A1 | 9/2001 | Tack-Don et al. | |
| 2002/0120839 A1* | 8/2002 | Hein, III | G06F 21/6272 713/153 |
| 2006/0248035 A1 | 11/2006 | Gendler et al. | |
| 2007/0038516 A1 | 2/2007 | Apple et al. | |
| 2007/0214043 A1 | 9/2007 | Yasuda | |
| 2009/0234731 A1 | 9/2009 | Mariotti | |
| 2009/0239663 A1* | 9/2009 | Ferdinand | G07F 17/3237 463/43 |
| 2009/0287553 A1 | 11/2009 | Colucci | |
| 2009/0292595 A1 | 11/2009 | Tonnison et al. | |
| 2010/0057558 A1 | 3/2010 | Yano | |
| 2010/0241507 A1 | 9/2010 | Quinn et al. | |
| 2010/0250330 A1 | 9/2010 | Lam et al. | |
| 2011/0022704 A1 | 1/2011 | Duan et al. | |
| 2011/0041168 A1 | 2/2011 | Murray et al. | |
| 2011/0145068 A1 | 6/2011 | King et al. | |
| 2011/0302025 A1 | 12/2011 | Hsiao et al. | |
| 2012/0143661 A1 | 6/2012 | Roberts et al. | |
| 2012/0232985 A1 | 9/2012 | Lasker et al. | |
| 2012/0232988 A1* | 9/2012 | Yang | H04N 13/366 705/14.49 |
| 2012/0253920 A1 | 10/2012 | Yarvis et al. | |
| 2013/0188095 A1 | 7/2013 | Hartson et al. | |
| 2013/0307956 A1 | 11/2013 | Hyde et al. | |
| 2014/0110468 A1 | 4/2014 | Kandregula | |
| 2014/0136334 A1 | 5/2014 | Lagassey | |
| 2014/0155022 A1 | 6/2014 | Kandregula | |
| 2014/0157288 A1 | 6/2014 | Wong | |
| 2014/0207559 A1 | 7/2014 | McCord et al. | |
| 2015/0074533 A1 | 3/2015 | Cafaro et al. | |
| 2015/0199084 A1 | 7/2015 | Velusamy | |
| 2016/0027059 A1 | 1/2016 | Lofthus | |
| 2016/0062612 A1 | 3/2016 | Chum et al. | |
| 2016/0155141 A1 | 6/2016 | Song et al. | |
| 2016/0267524 A1 | 9/2016 | Ng | |
| 2017/0195730 A1 | 7/2017 | Das et al. | |
| 2018/0033045 A1* | 2/2018 | Flynn | G06Q 30/0269 |
| 2018/0092696 A1 | 4/2018 | Qian et al. | |
| 2019/0227510 A1* | 7/2019 | Hoggatt | G06Q 30/0272 |
| 2021/0021901 A1 | 1/2021 | Gupta et al. | |

FOREIGN PATENT DOCUMENTS

| | | | |
|---|---|---|---|
| CN | 2852564 | Y | 12/2006 |
| CN | 101854587 | A | 10/2010 |
| CN | 101859420 | A | 10/2010 |
| CN | 204029016 | U | 12/2014 |
| CN | 104504572 | A | 4/2015 |
| CN | 104794994 | A | 7/2015 |
| CN | 204576677 | U | 8/2015 |
| CN | 105183793 | A | 12/2015 |
| CN | 105719160 | A | 6/2016 |
| CN | 205540915 | U | 8/2016 |
| CN | 105956161 | A | 9/2016 |
| CN | 205881396 | U | 1/2017 |
| CN | 106789905 | A | 5/2017 |
| CN | 206258983 | U | 6/2017 |
| CN | 206303845 | U | 7/2017 |
| CN | 206363385 | U | 7/2017 |
| CN | 107679921 | A | 2/2018 |
| CN | 207056095 | U | 3/2018 |
| JP | 2000075792 | A | 3/2000 |
| JP | 2002157494 | A | 5/2002 |
| JP | 2002218061 | A | 8/2002 |
| JP | 2003039818 | A | 2/2003 |
| JP | 2006209216 | A | 8/2006 |
| JP | 2006237682 | A | 9/2006 |
| JP | 2011258132 | A | 12/2011 |
| KR | 20000036514 | A | 7/2000 |
| KR | 20010095526 | A | 11/2001 |
| KR | 20020084792 | A | 11/2002 |
| KR | 20020086375 | A | 11/2002 |
| KR | 100771613 | B1 | 10/2007 |
| KR | 101266306 | B1 | 5/2013 |
| KR | 101436413 | B1 | 9/2014 |
| KR | 101569077 | B1 | 11/2015 |
| KR | 1020160021302 | A | 2/2016 |
| KR | 1020160137174 | A | 11/2016 |
| KR | 1020190065883 | A | 6/2019 |
| TW | 201133368 | A | 10/2011 |
| WO | 2006048974 | A1 | 5/2006 |
| WO | 2007013955 | A2 | 2/2007 |

OTHER PUBLICATIONS

Office Action issued in U.S. Appl. No. 17/392,351 mailed Dec. 15, 2021.

Office Action issued in U.S. Appl. No. 17/392,351 mailed Jun. 3, 2022.

Office Action issued in U.S. Appl. No. 17/392,351 mailed Oct. 26, 2022.

Notice of Allowance issued in U.S. Appl. No. 17/392,351 mailed Mar. 24, 2023.

* cited by examiner

600

| Code | Content | Device ID | Start of Presentation | End of Presentation | Duration of Presentation | Offer Expiration Time | User Device ID(s) | User Interaction Time | Elapsed Time Until Interaction | Offer Accepted? |
|------|---------|-----------|----------------------|---------------------|--------------------------|----------------------|-------------------|----------------------|-------------------------------|-----------------|
| B36F | Coffee Brand X | 7F9J | 19:45:20 | 19:45:50 | 0:00:30 | 20:45:20 | KL24 | 19:45:45 | 0:00:25 | Yes |
| B36F | Coffee Brand X | J51P | 18:29:00 | 18:29:30 | 0:00:30 | 19:29:00 | QP85 | Null | Null | Null |

602  604  606  608  610  612  614  616  618  620  622

650

652

| Code | Content | # of Content Presentations | # of User Interactions | Average Interaction Time | % Interactions to Purchase |
|------|---------|---------|---------|---------|---------|
| B36F | Coffee Brand X | 1,021,042 | 32,924 | 23.3 Seconds | 15.40% |
| B36G | Shoe Brand Y | 952,133 | 29,284 | 24.2 Seconds | 13.80% |

VISUAL INDICATION PRESENTATION AND INTERACTION PROCESSING SYSTEMS AND METHODS

CROSS-REFERENCE TO RELATED APPLICATIONS

This application is a continuation of U.S. patent application Ser. No. 17/392,351, filed Aug. 3, 2021, now U.S. Pat. No. 11,720,921, issued Aug. 8, 2023, which claims the benefit of U.S. Provisional Application No. 63/065,009, filed Aug. 13, 2020, the entire disclosure of each of the applications cited in this sentence is hereby incorporated herein by reference.

TECHNICAL FIELD

Aspects of this disclosure generally are related to visual indication presentation and interaction processing systems and methods including, in some embodiments of the present invention, determining particular content associated with an observable presentation of a visual indicator and determining that a user interaction with the visual indicator is associated with the particular content.

BACKGROUND

Digital advertising across the Internet, World Wide Web, or apps on mobile devices promote products, services, or applications by delivering marketing messages or other digital content in order to attract customers. Since digital advertising can be expensive for advertisers, it is important for such advertisers to understand the effectiveness of the money they spend on digital advertising. However, the present inventors understand that present schemes for determining the effectiveness of digital advertising can be simplified and can be made to be more comprehensive. For example, conventional advertisement tracking systems may attempt to track presentations of an advertisement, e.g., by recording each time the advertisement is digitally transmitted over a network to a device for presentation by the device. However, such a scheme is limited in the context and manner in which presentation of the digital advertisement is detected, and it is limited in the information that it can provide to an advertiser about the effectiveness of its digital advertising campaign. For example, such a scheme requires tracking of the transmission of a digital advertisement at the point of transmission, which may not be suitable in some contexts. Further, such a scheme actually tracks a number of transmissions of the digital advertisement, which may incorrectly or incompletely reflect actual presentations of the digital advertisement, such as if the transmission fails to complete, or is successfully transmitted, but not actually presented at the target display device due to some technical situation at the target display device.

Accordingly, the present inventors recognized that there is a need in the art for improvements in processing not only digital advertisement presentations, but also presentations of other forms of digital content.

SUMMARY

At least the above-discussed need is addressed and technical solutions are achieved in the art by various embodiments of the present invention. In some embodiments, systems and methods are provided for processing presentations, interactions with, or both presentations and interactions with visual indicators.

In some embodiments a system includes a data processing device system, a processor-accessible memory device system communicatively connected to the data processing device system, and an input-output device system communicatively connected to the data processing device system. The data processing device system may be configured, via a program stored in the processor-accessible memory device system, at least to: receive from a first device system, via the input-output device system communicatively connected to a communications network, a first indication of observable presentation of a visual indicator, the first indication consistent with origination from a content monitoring program detecting observable presentation of the visual indicator via monitoring of device-presented content by the content monitoring program; determine particular content associated with the received first indication of observable presentation of the visual indicator; store, in the processor-accessible memory device system and in response to determining that the particular content is associated with the received first indication of observable presentation of the visual indicator, a recorded-presentation indication indicating that the particular content or information associated therewith has been device-presented; receive from a second device system and via the input-output device system communicatively connected to the communications network, a second indication of a user interaction with the visual indicator, the second indication consistent with origination from a different program distinct from the content monitoring program; determine that the particular content is associated with the received second indication of the user interaction with the visual indicator; and store, in the processor-accessible memory device system and in response to determining that the particular content is associated with the received second indication of the user interaction with the visual indicator, an interaction indication that the particular content has been interacted with by a user.

The particular content associated with the received first indication of observable presentation of the visual indicator may be different than the visual indicator.

The second device system may be the first device system, such that the same device system provides the first indication of observable presentation of the visual indicator and provides the second indication of the user interaction with the visual indicator. The same device system, which may be the first device system and the second device system, may execute the content monitoring program and the different program. The observable presentation of the visual indicator and the user interaction with the visual indicator may occur at the same device system, which is the first device system and the second device system.

The observable presentation of the visual indicator may be a first observable presentation of the visual indicator. The second device system may be configured by the different program at least to analyze an image captured by a camera system of the second device system. The image may include a second observable presentation of the visual indicator.

The visual indicator may be a static, visible image representation of a code.

The first indication of observable presentation of the visual indicator may include a time stamp indicating a time of initiation of the observable presentation of the visual indicator. The data processing device system may be configured, via the program stored in the processor-accessible memory device system, at least to: receive from the first device system, via the input-output device system communicatively connected to the communications network, a conclusion time indication indicating a time of conclusion of the observable presentation of the visual indicator; determine, based at least on an analysis of the time of initiation of the observable presentation of the visual indicator and the time of conclusion of the observable presentation of the visual indicator, a duration of time of the observable presentation of the visual indicator; and store, in the processor-accessible memory device system in association with the recorded-presentation indication indicating that the particular content has been device-presented, a duration indication indicating the determined duration of time of the observable presentation of the visual indicator. The data processing device system may be configured, via the program stored in the processor-accessible memory device system, at least to: receive from the second device system, via the input-output device system communicatively connected to the communications network, a user interaction time indication indicating a time of user interaction with the visual indicator; determine, based at least on an analysis of the time of initiation of the observable presentation of the visual indicator and the user interaction time indication indicating the time of user interaction with the visual indicator, a duration of elapsed time until occurrence of the user interaction with the visual indicator; and store, in the processor-accessible memory device system in association with the recorded-presentation indication indicating that the particular content has been device-presented, a user interaction elapsed time indication indicating the determined duration of elapsed time until occurrence of the user interaction with the visual indicator. The data processing device system may be configured, via the program stored in the processor-accessible memory device system, at least to: determine, based at least on an analysis of the time of initiation of the observable presentation of the visual indicator, an offer-available time indication indicating a time in which an offer is available; store, in the processor-accessible memory device system in association with the recorded-presentation indication indicating that the particular content has been device-presented, the determined offer-available time indication indicating the time in which the offer is available; determine, based at least on an analysis of the time in which the offer is available and the time of user interaction, an offer-acceptance indication indicating that the offer is accepted by the user interaction; and store, in the processor-accessible memory device system, the offer-acceptance indication. The data processing device system may be configured, via the program stored in the processor-accessible memory device system, at least to: transmit, in response to determining the offer-acceptance indication and via the input-output device system communicatively connected to the communications network, an instruction to execute a provision of a product, service, or both a product and service.

The data processing device system may be configured, via the program stored in the processor-accessible memory device system, at least to: transmit to a third device system, in response to determining that the particular content is associated with the received second indication of the user interaction with the visual indicator and via the input-output device system communicatively connected to the communications network, an instruction to visually present a web page associated with the particular content. The web page may include a tracking pixel configured to track a user's visit to the web page. The third device system may be the second device system, such that the third device system and the second device system are the same device system, and such that the same device system provides the second indication of the user interaction with the visual indicator and presents the web page associated with the particular content including the tracking pixel configured to track the user's visit to the web page. The third device system may be the first device system, such that the third device system and the first device system are the same device system, and such that the same device system provides the first indication of the observable presentation of the visual indicator and presents the web page associated with the particular content including the tracking pixel configured to track the user's visit to the web page.

The first device system may execute the content monitoring program and provide the observable presentation of the visual indicator via a display device system of the first device system.

The user interaction may include a photographing of the visual indicator at a device different than a device that provides the observable presentation of the visual indicator.

The user interaction may include a touching of a display region of a touch-enabled display device that provides the observable presentation of the visual indicator.

The visual indicator may be configured to attract user interaction.

Various embodiments of the present invention may include systems, devices, or machines that are or include combinations or subsets of any one or more of the systems, devices, or machines and associated features thereof summarized above or otherwise described herein (which should be deemed to include the figures).

Further, all or part of any one or more of the systems, devices, or machines summarized above or otherwise described herein or combinations or sub-combinations thereof may implement or execute all or part of any one or more of the processes or methods described herein or combinations or sub-combinations thereof.

For example, in some embodiments, a visual indication presentation and interaction processing method may be executed by a data processing device system communicatively connected to a processor-accessible memory device system and an input-output device system, and the method may include: receiving from a first device system, via the input-output device system communicatively connected to a communications network, a first indication of observable presentation of a visual indicator, the first indication consistent with origination from a content monitoring program detecting observable presentation of the visual indicator via monitoring of device-presented content by the content monitoring program; determining particular content associated with the received first indication of observable presentation of the visual indicator; storing, in the processor-accessible memory device system and in response to determining that the particular content is associated with the received first indication of observable presentation of the visual indicator, a recorded-presentation indication indicating that the particular content or information associated therewith has been device-presented; receiving from a second device system, via the input-output device system communicatively connected to the communications network, a second indication of a user interaction with the visual indicator, the second indication consistent with origination from a different program distinct from the content monitoring program; determining that the particular content is associated with the received second indication of the user interaction with the visual indicator; and storing, in the processor-accessible memory device system and in response to determining that the particular content is associated with the received second indication of the user interaction with the visual indicator, an interaction indication that the particular content has been interacted with by a user.

It should be noted that various embodiments of the present invention include variations of the methods or processes summarized above or otherwise described herein (which should be deemed to include the figures) and, accordingly, are not limited to the actions described or shown in the figures or their ordering, and not all actions shown or described are required according to various embodiments. According to various embodiments, such methods may include more or fewer actions and different orderings of actions. Any of the features of all or part of any one or more of the methods or processes summarized above or otherwise described herein may be combined with any of the other features of all or part of any one or more of the methods or processes summarized above or otherwise described herein.

In addition, a computer program product may be provided that includes program code portions for performing some or all of any one or more of the methods or processes and associated features thereof described herein, when the computer program product is executed by a computer or other computing device or device system. Such a computer program product may be stored on one or more computer-readable storage mediums, also referred to as one or more computer-readable data storage mediums or a computer-readable storage medium system.

For example, a computer-readable storage medium system may include one or more computer-readable storage mediums storing a program executable by one or more data processing devices of a data processing device system communicatively connected to an input-output device system, the program may include: first reception instructions configured to cause reception from a first device system, via the input-output device system communicatively connected to the communications network, of a first indication of observable presentation of a visual indicator, the first indication consistent with origination from a content monitoring program detecting observable presentation of the visual indicator via monitoring of device-presented content by the content monitoring program; first determination instructions configured to cause a determination of particular content associated with the received first indication of observable presentation of the visual indicator; first storage instructions configured to cause storage, in a processor-accessible memory device system and in response to determining that the particular content is associated with the received first indication of observable presentation of the visual indicator, of a recorded-presentation indication indicating that the particular content or information associated therewith has been device-presented; second reception instructions configured to cause reception from a second device system, via the input-output device system communicatively connected to the communications network, of a second indication of a user interaction with the visual indicator, the second indication consistent with origination from a different program distinct from the content monitoring program; second determination instructions configured to cause a determination that the particular content is associated with the received second indication of the user interaction with the visual indicator; and second storage instructions configured to cause storage, in the processor-accessible memory device system and in response to determining that the particular content is associated with the received second indication of the user interaction with the visual indicator, of an interaction indication that the particular content has been interacted with by a user. The computer-readable storage medium system may be a non-transitory computer-readable storage medium system including one or more non-transitory computer-readable storage mediums.

In some embodiments, each of any of one or more of the computer-readable (data) storage medium systems (also referred to as processor-accessible memory device systems) described herein is a non-transitory computer-readable (or processor-accessible) (data) storage medium system (or memory device system) including or consisting of one or more non-transitory computer-readable (or processor-accessible) storage mediums (or memory devices) storing the respective program(s) which may configure a data processing device system to execute some or all of any of one or more of the methods or processes described herein.

Further, any of all or part of one or more of the methods or processes and associated features thereof discussed herein may be implemented or executed on or by all or part of a device system, apparatus, or machine, such as all or a part of any of one or more of the systems, apparatuses, or machines described herein or a combination or sub-combination thereof.

BRIEF DESCRIPTION OF DRAWINGS

It is to be understood that the attached drawings are for purposes of illustrating aspects of various embodiments and may include elements that are not to scale.

DETAILED DESCRIPTION

Figure 1:
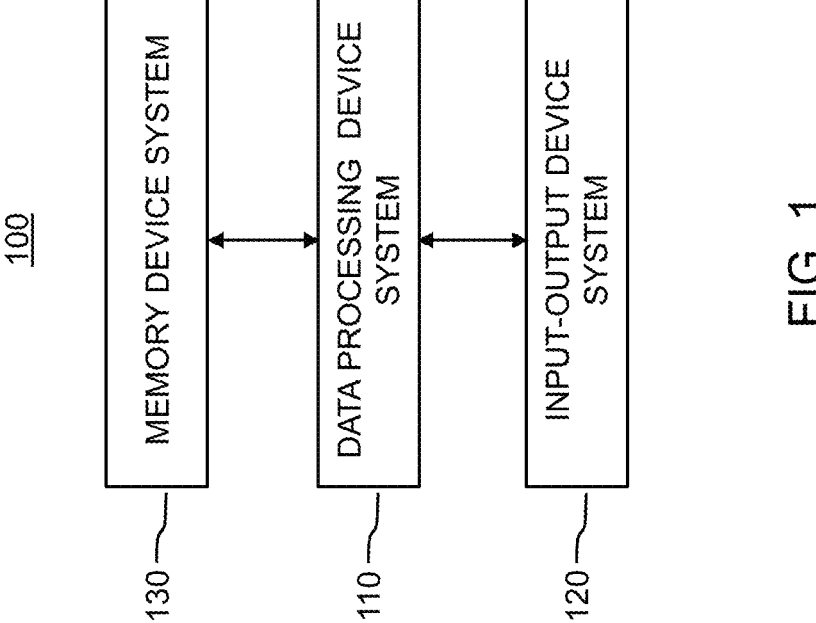
FIG. 1 illustrates a computing device system, according to some embodiments of the present invention.

The above-discussed need in the art is addressed by visual indication presentation and interaction processing systems and methods, according to various embodiments of the present invention. In some embodiments, digital or particular content that is desired to be monitored, e.g., for advertisement campaign evaluation or other purposes, may be presented along with a visual indicator, and a first device system may execute a content monitoring program that, in some embodiments, may be configured to monitor digital content presented by a device and detect observable presentation of the visual indicator, according to some embodiments. In response to detecting the visual indicator, the first device system may transmit a first indication of observable presentation of the visual indicator to a server device system, according to some embodiments. The first indication may provide an indication that the digital content has been device-presented. By using a visual indicator as a proxy for presentation of the digital content that is desired to be monitored, data processing, storage, and transmission efficiencies are increased, at least in some embodiments and contexts where the visual indicator is simpler, smaller, or is a static image, compared to, e.g., cases where the digital content that is desired to be monitored is a larger, more complex, or is a moving image (e.g., video), according to some embodiments. In some embodiments, the visual indicator is a simple visual observable representation of an object, in contrast to, e.g., a more complex digital watermark, which is not observable by normal human eyesight perception, is more difficult to process, requires more data storage, and avoids user or viewer awareness. An additional benefit of the visual indicator, at least in some embodiments and contexts, is that it does not avoid user or viewer awareness and, instead, may, in some embodiments, be designed or configured to attract user or viewer attention or interaction by visually standing out (e.g., via visual separation or isolation, color contrast, highlighting, flashing, color variability, boldness, text or accompanying text or image urging user interaction, etc.) compared to the digital content that is desired to be monitored, or compared to background image(s) concurrently visually presented by the respective device or device system.

In some embodiments, a second device system may execute a user interaction monitoring program configured to detect user interaction with the visual indicator and, at least in response to the detection, to transmit to the server device system, a second indication indicative of the user interaction with the visual indicator. The server device system may be configured, e.g., by a program (i.e., a program set of one or more programs) to determine that both the first indication and the second indication are associated with the same visual indicator, e.g., linked to the same digital content, to, e.g., determine or indicate that the digital content has not only been presented by a device, but also interacted with by a user or viewer at the device, according to some embodiments. In the context of at least digital advertising, such a determination of interaction provides valuable additional information about the performance of a digital advertising or other monitoring campaign, according to some embodiments. Further, recordation of the user interaction signifies a confirmation that the digital or particular content that is desired to be monitored has, in fact, been device presented, according to some embodiments. Further, recordation of the user interaction can prompt and provide additional interactions between the content provider and the user/potential customer, in some contexts and embodiments, thereby increasing value to both the content provider (e.g., an advertiser in some contexts) and the user/potential customer, according to some embodiments. For example, in some embodiments, the server device system may instruct the provision of a product or service, associated with the digital or particular content, to the user or viewer who interacted with the visual indicator associated with the digital or particular content, to further increase benefits, according to some embodiments.

These and other features and benefits according to various embodiments of the present invention are described in more detail below. It should be noted, however, that the invention is not limited to the above or any other examples provided herein, which are referred to for purposes of illustration only.

In this regard, in the descriptions herein, certain specific details are set forth in order to provide a thorough understanding of various embodiments of the invention. However, one skilled in the art will understand that the invention may be practiced at a more general level without one or more of these details. In other instances, well-known structures have not been shown or described in detail to avoid unnecessarily obscuring descriptions of various embodiments of the invention.

Any reference throughout this specification to "one embodiment", "an embodiment", "an example embodiment", "an illustrated embodiment", "a particular embodiment", and the like means that a particular feature, structure or characteristic described in connection with the embodiment is included in at least one embodiment. Thus, any appearance of the phrase "in one embodiment", "in an embodiment", "in an example embodiment", "in this illustrated embodiment", "in this particular embodiment", or the like in this specification is not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects, unless otherwise explicitly noted or required by context.

Further, the phrase "at least" is or may be used herein at times merely to emphasize the possibility that other elements may exist besides those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

The word "device", the word "machine", the word "system", and the phrase "device system" all are intended to include one or more physical devices or sub-devices (e.g., pieces of equipment) that interact to perform one or more functions, regardless of whether such devices or sub-devices are located within a same housing or different housings. However, it may be explicitly specified according to various embodiments that a device or machine or device system resides entirely within a same housing to exclude embodiments where the respective device, machine, system, or device system resides across different housings. The word "device" may equivalently be referred to as a "device system" in some embodiments.

Further, the phrase "in response to" may be used in this disclosure. For example, this phrase may be used in the following context, where an event A occurs in response to the occurrence of an event B. In this regard, such phrase includes, for example, that at least the occurrence of the event B causes or triggers the event A in some embodiments.

The phrase "derivative thereof" and the like is or may be used herein at times in the context of a derivative of data or information merely to emphasize the possibility that such data or information may be modified or subject to one or more operations. For example, if a device generates first data for display, the process of converting the generated first data into a format capable of being displayed may alter the first data. This altered form of the first data may be considered a derivative of the first data. For instance, the first data may be a one-dimensional array of numbers, but the display of the first data may be a color-coded bar chart representing the numbers in the array. For another example, if the above-mentioned first data is transmitted over a network, the process of converting the first data into a format acceptable for network transmission or understanding by a receiving device may alter the first data. As before, this altered form of the first data may be considered a derivative of the first data. For yet another example, generated first data may undergo a mathematical operation, a scaling, or a combining with other data to generate other data that may be considered derived from the first data. In this regard, it can be seen that data is commonly changing in form or being combined with other data throughout its movement through one or more data processing device systems, and any reference to information or data herein is intended to include these and like changes, regardless of whether or not the phrase "derivative thereof" or the like is used in reference to the information or data, unless otherwise required by context. As indicated above, usage of the phrase "or a derivative thereof" or the like merely emphasizes the possibility of such changes. Accordingly, the addition of or deletion of the phrase "or a derivative thereof" or the like should have no impact on the interpretation of the respective data or information. For example, the above-discussed color-coded bar chart may be considered a derivative of the respective first data or may be considered the respective first data itself.

The term "program" in this disclosure should be interpreted to include one or more programs including as a set of instructions or modules that may be executed by one or more components in a system, such as a controller system or data processing device system, in order to cause the system to perform one or more operations. The set of instructions or modules may be stored in or by any kind of memory device, such as those described subsequently with respect to the memory device system 130, 151, or both, shown in FIGS. 1 and 2, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). Such descriptions should be deemed to be equivalent to describing that the instructions or modules are configured to cause the performance of the action. The word "module" may be defined as a set of instructions. The word "program" and the word "module" may each be interpreted to include multiple sub-programs or multiple sub-modules, respectively. In this regard, reference to a program or a module may be considered to refer to multiple programs or multiple modules.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, 'data X', such as a stored indication, may be encrypted for transmission, and a reference to 'data X' is intended to include both its encrypted and unencrypted forms, unless otherwise required or indicated by context. For another example, 'image information Y', such as a visual indicator or visual digital content may undergo a noise filtering process, and a reference to 'image information Y' is intended to include both the pre-processed form and the noise-filtered form, unless otherwise required or indicated by context. In other words, both the pre-processed form and the noise-filtered form are considered to be 'image information Y', unless otherwise required or indicated by context. In order to stress this point, the phrase 'or a derivative thereof' or the like may be used herein. Continuing the preceding example, the phrase 'image information Y or a derivative thereof' refers to both the pre-processed form and the noise-filtered form of 'image information Y', unless otherwise required or indicated by context, with the noise-filtered form potentially being considered a derivative of 'image information Y'. However, non-usage of the phrase 'or a derivative thereof' or the like nonetheless includes derivatives or modifications of information or data.

Figure 5:
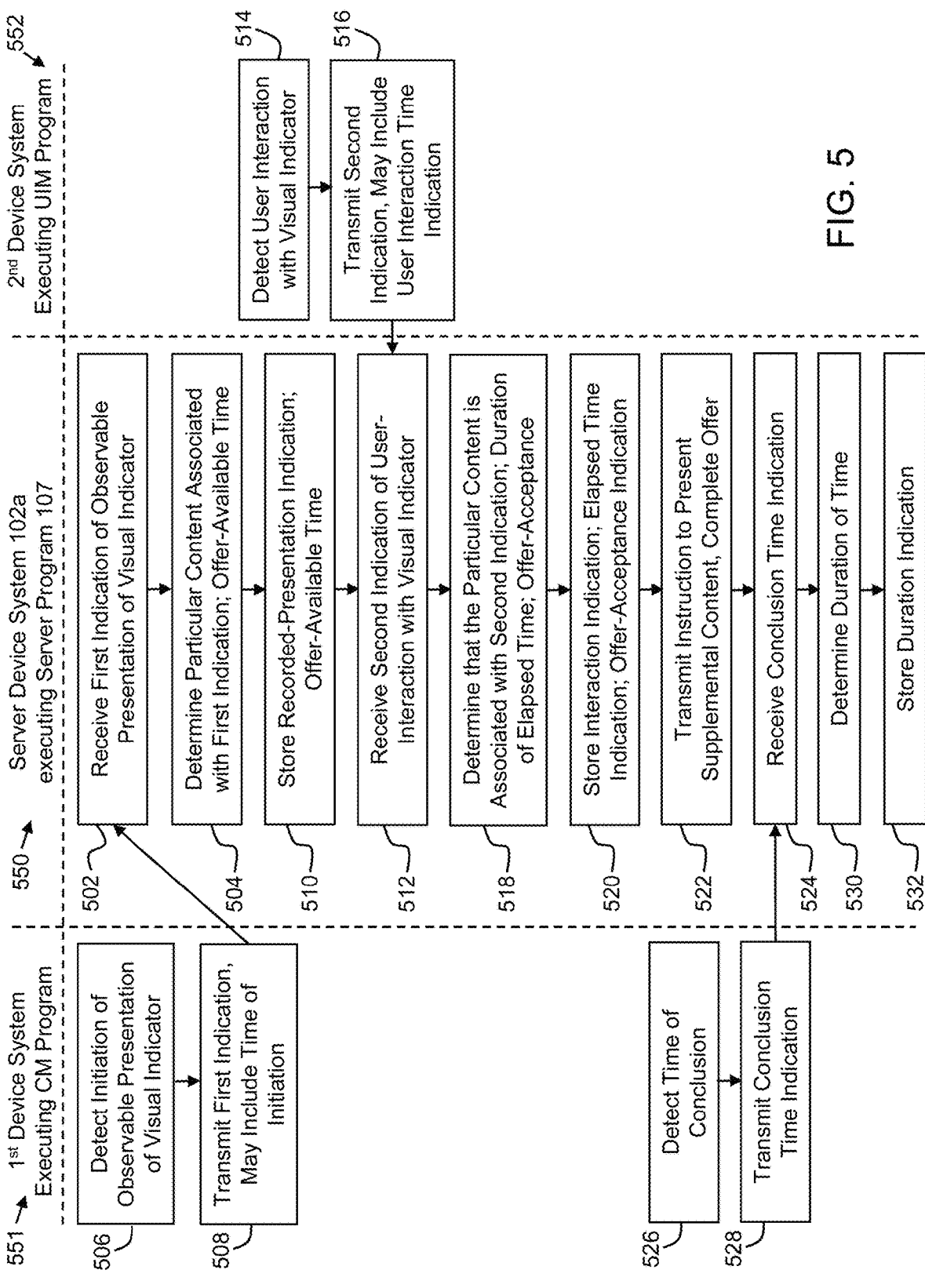
FIG. 5 illustrates various visual indication presentation and interaction processing methods, which may be implemented as a program (i.e., a program set of one or more programs) executable by one or more computing devices or device systems of the computing device system of FIG. 1, FIG. 2, FIG. 3, or FIG. 4, according to various embodiments of the present invention.

Example methods are described herein with respect to FIG. 5. Such figure is described to include blocks associated with program or computer-executable instructions, according to various embodiments. It should be noted that the respective instructions associated with any such blocks herein need not be separate instructions and may be combined with other instructions to form a combined instruction set. The same set of instructions may be associated with more than one block. In this regard, the block arrangement shown by the methods of FIG. 5 herein is not limited to an actual structure of any program or set of instructions or required ordering of method tasks, and such method FIG. 5, according to some embodiments, merely illustrates the tasks that instructions are configured to perform, for example, upon execution of a corresponding program by a data processing device system in conjunction with interactions with one or more other devices or device systems.

FIG. 1 schematically illustrates a special purpose computing device system, according to some embodiments of the present invention. In some embodiments, the system 100 may provide respective instances of nodes 102 (e.g., FIGS. 3 and 4, discussed below) of a visual indication presentation and interaction system 101, or the system 100 may represent more than one or all of such nodes 102, according to some embodiments. The system 100 may include a data processing device system 110, an input-output device system 120, and a processor-accessible memory device system 130. The processor-accessible memory device system 130 and the input-output device system 120 are communicatively connected to the data processing device system 110. In some embodiments, the phrase "computing device" may be defined as the entirety of the system 100. In some embodiments, the phrase "computing device" may be defined as all or a portion of the data processing device system 110. In some embodiments, the phrase "computing device system" may be defined as one or more computing devices.

The data processing device system 110 may include one or more data processing devices that implement or execute, in conjunction with other devices, such as one or more of those in the system 100, methods of various embodiments of the present invention, including the example methods of FIG. 5 described herein. Each of the phrases "data processing device", "data processor", "processor", "computing device", and "computer" is intended to include any data processing device, such as a central processing unit ("CPU"), a desktop computer, a laptop computer, a mainframe computer, a tablet computer, a cellular phone, a smartphone, a personal digital assistant, and any other device configured to process data, manage data, or handle data, whether implemented with electrical, magnetic, optical, quantum, biological components, or otherwise. The data processing device system 110 may be a distributed data processing device system including multiple communicatively connected data processing devices. On the other hand, the data processing device system 110 need not be a distributed data processing device system and, consequently, may include one or more data processing device system 110 located within a single housing.

Figure 6:
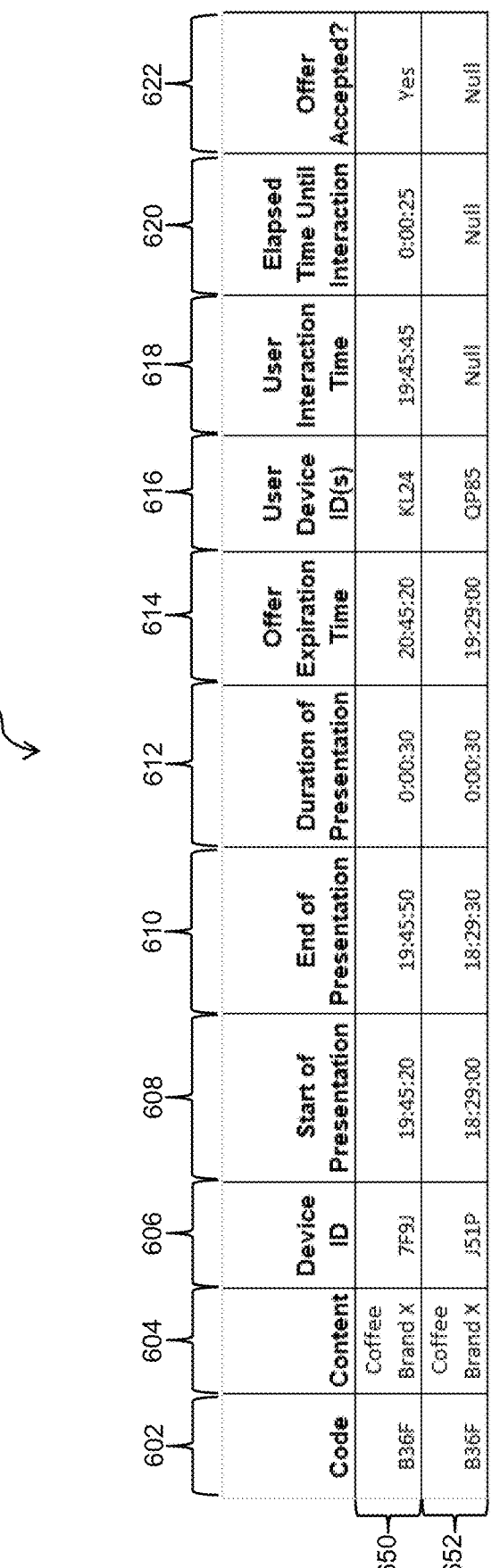
FIG. 6 illustrates a data structure including data associated with (e.g., stored by, processed by, or both) one or more computing devices or device systems of FIG. 1, FIG. 2, FIG. 3, or FIG. 4, according to some embodiments of the present invention.
Figure 7:
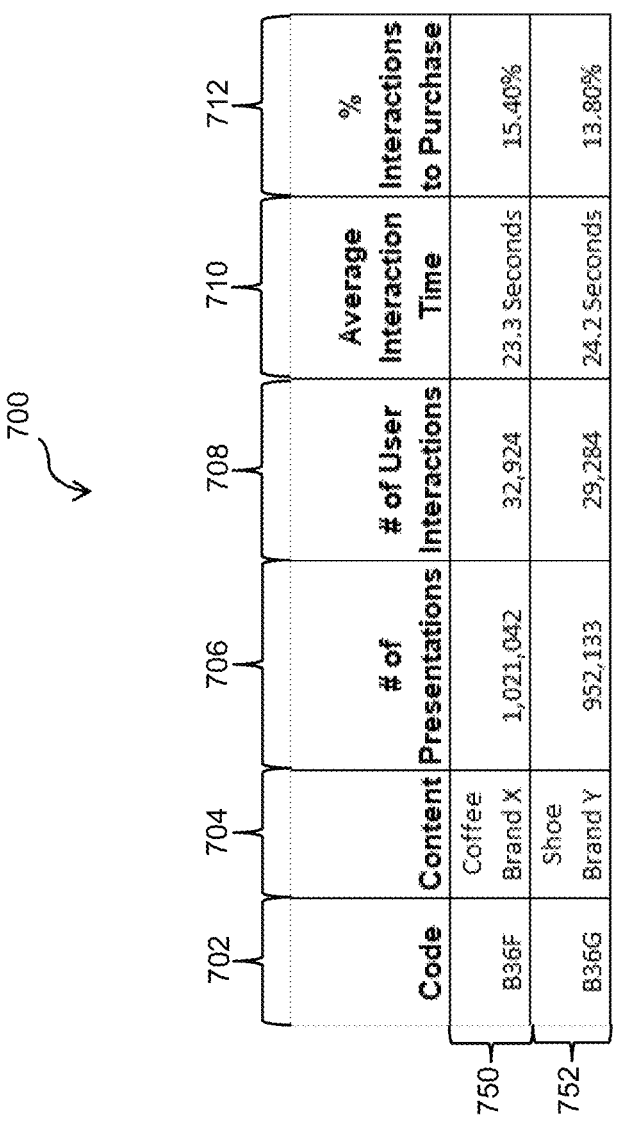
FIG. 7 illustrates a data structure including data associated with (e.g., stored by, processed by, or both) one or more computing devices or device systems of FIG. 1, FIG. 2, FIG. 3, or FIG. 4, according to some embodiments of the present invention.

The memory device system 130 (also referred to as processor-accessible memory device system 130) may include one or more processor-accessible memory devices configured to store program instructions and other information, including the information, such as that shown in FIG. 6 and FIG. 7, as well as program instructions needed to execute the methods of various embodiments, including the example methods of FIG. 5 described herein. In this regard, each of the blocks illustrated in the example methods of FIG. 5 may represent program instructions stored in the memory device system 130 and configured to cause execution of the actions of the respective block. In some embodiments, as discussed in more detail below, the memory device system 130 may store a server program 107, a content monitoring program 105a, a user interface monitoring program 105b, or a combination of one or more of these programs, depending on a configuration of the corresponding data processing device system (e.g., data processing device system 110), according to various embodiments of the present invention. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device or housing.

Each of the phrases "processor-accessible memory" and "processor-accessible memory device" and the like is intended to include any processor-accessible data storage device or medium, whether volatile or nonvolatile, electronic, magnetic, quantum, optical, or otherwise, including but not limited to, registers, floppy disks, hard disks, Compact Discs, DVDs, SSDs, flash memories, ROMs, and RAMs. In some embodiments, each of the phrases "processor-accessible memory" and "processor-accessible memory device" is intended to include or be a processor-accessible (or computer-readable) data storage medium. In some embodiments, each of the phrases "processor-accessible memory" and "processor-accessible memory device" is intended to include or be a non-transitory processor-accessible (or computer-readable) data storage medium. In some embodiments, the processor-accessible memory device system 130 may be considered to include or be a non-transitory processor-accessible (or computer-readable) data storage medium system. And, in some embodiments, the memory device system 130 may be considered to include or be a non-transitory processor-accessible (or computer-readable) storage medium system or data storage medium system including or consisting of one or more non-transitory processor-accessible (or computer-readable) storage or data storage mediums.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending on the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device or housing, the system 100 of FIG. 1 may be implemented by a single application-specific integrated circuit (ASIC) in some embodiments.

The input-output device system 120 may include a mouse, a keyboard, a touch screen, a computer, a processor-accessible memory device, a network-interface-card or network-interface circuitry, or any device or combination of devices from which a desired selection, desired information, instructions, or any other data is input to the data processing device system 110. The input-output device system 120 may include a user-activatable control system that is responsive to a user action. The input-output device system 120 may include any suitable interface for receiving a selection, information, instructions, or any other data from other devices or systems described in various ones of the embodiments.

The input-output device system 120 also may include an image generating device system, a display device system, a speaker device system, a computer, a processor-accessible memory device system, a network-interface-card or network-interface circuitry, or any device or combination of devices to which information, instructions, or any other data is output by the data processing device system 110. In this regard, the input-output device system 120 may include various other devices or systems described in various embodiments. The input-output device system 120 may include any suitable interface for outputting information, instructions, or data to other devices and systems described in various embodiments. If the input-output device system 120 includes a processor-accessible memory device, such memory device may or may not form part or all of the memory device system 130.

Figure 2:
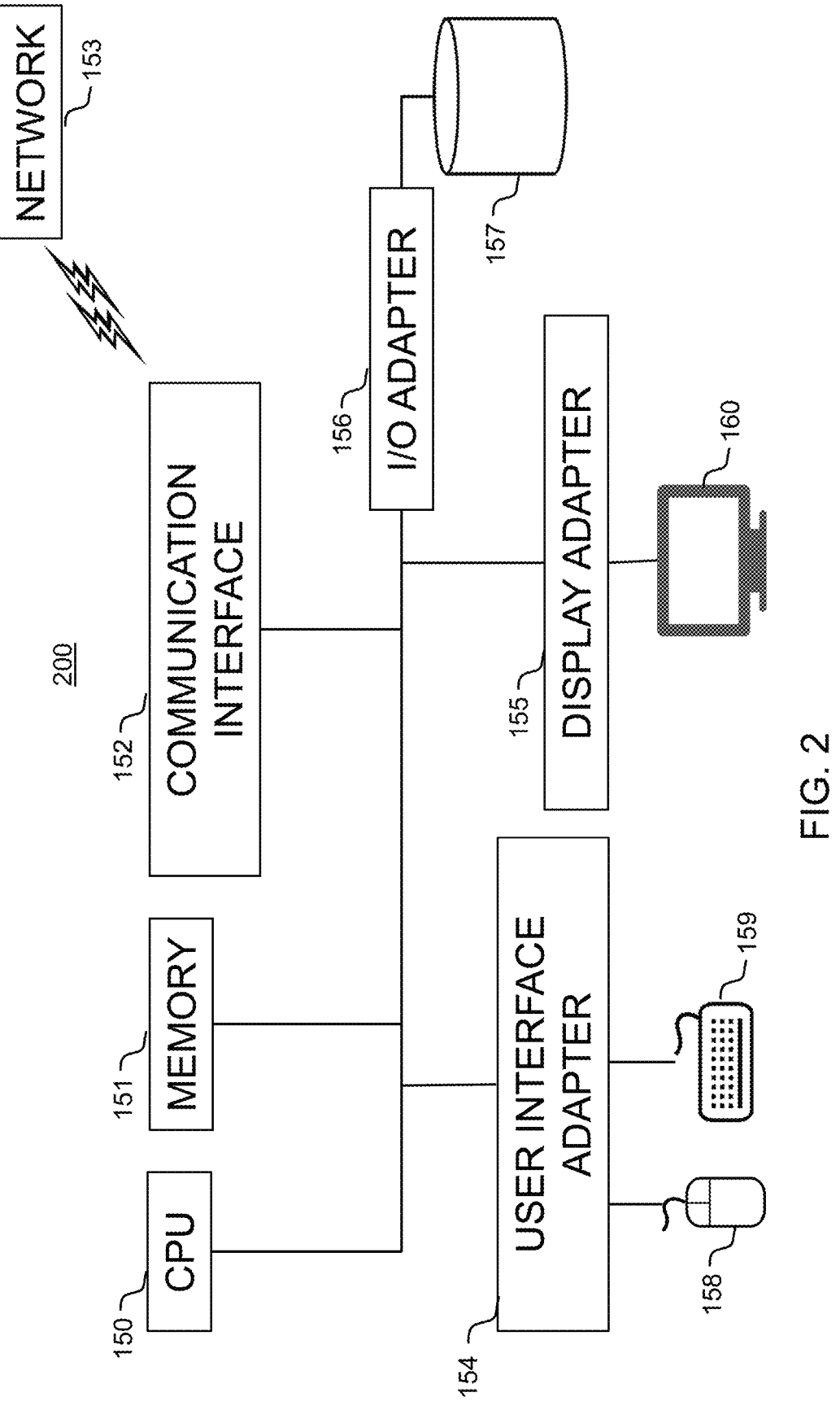
FIG. 2 illustrates a computing device system, which may be a particular implementation of all or part of the computing device system of FIG. 1, according to some embodiments of the present invention.
Figure 3:
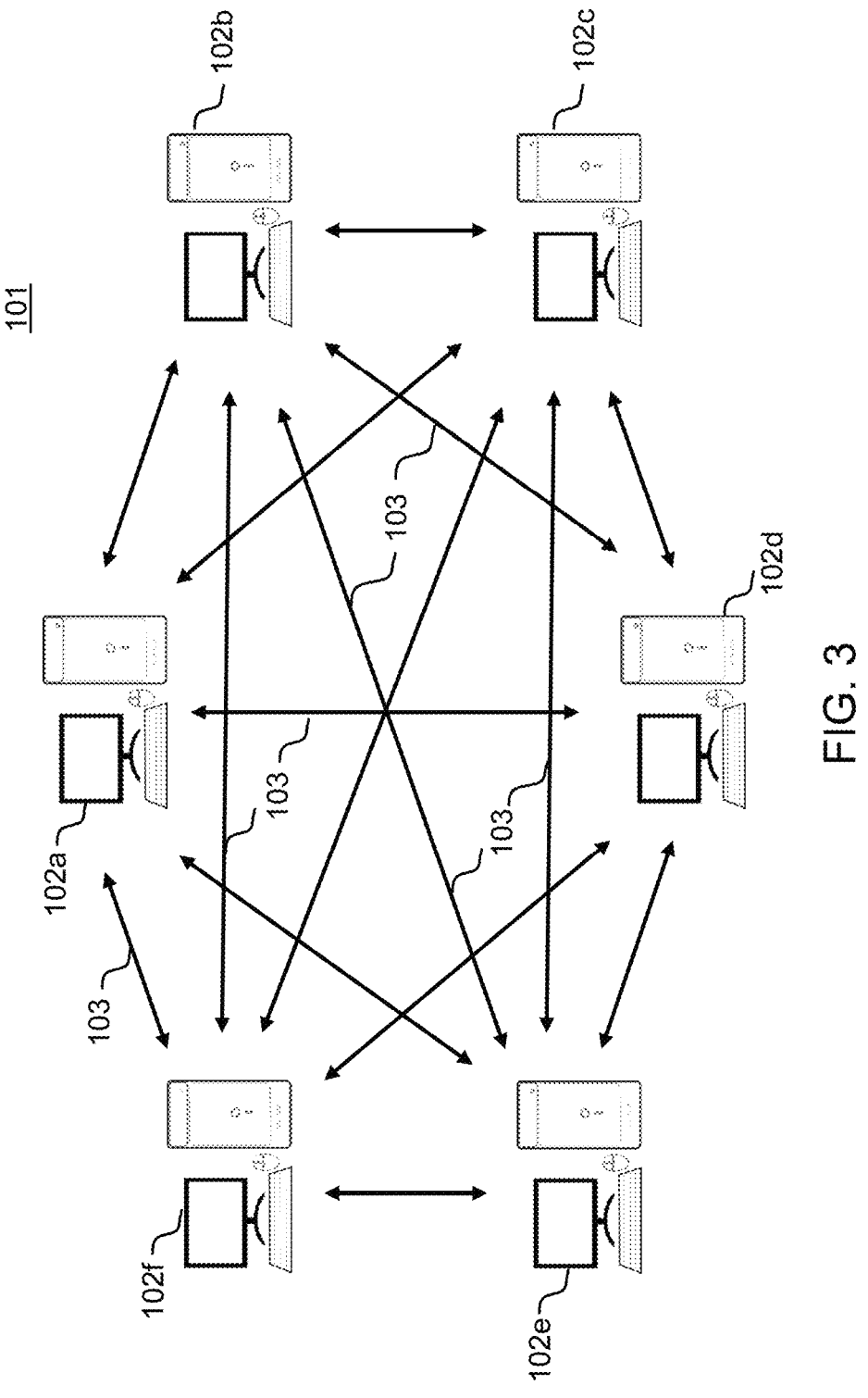
FIG. 3 illustrates at least a portion of a visual indication presentation and interaction processing system including a network of computing devices or device systems, wherein the visual indication presentation and interaction processing system may be a particular implementation of at least all or part of the computing device system of FIG. 1, according to some embodiments of the present invention.
Figure 4:
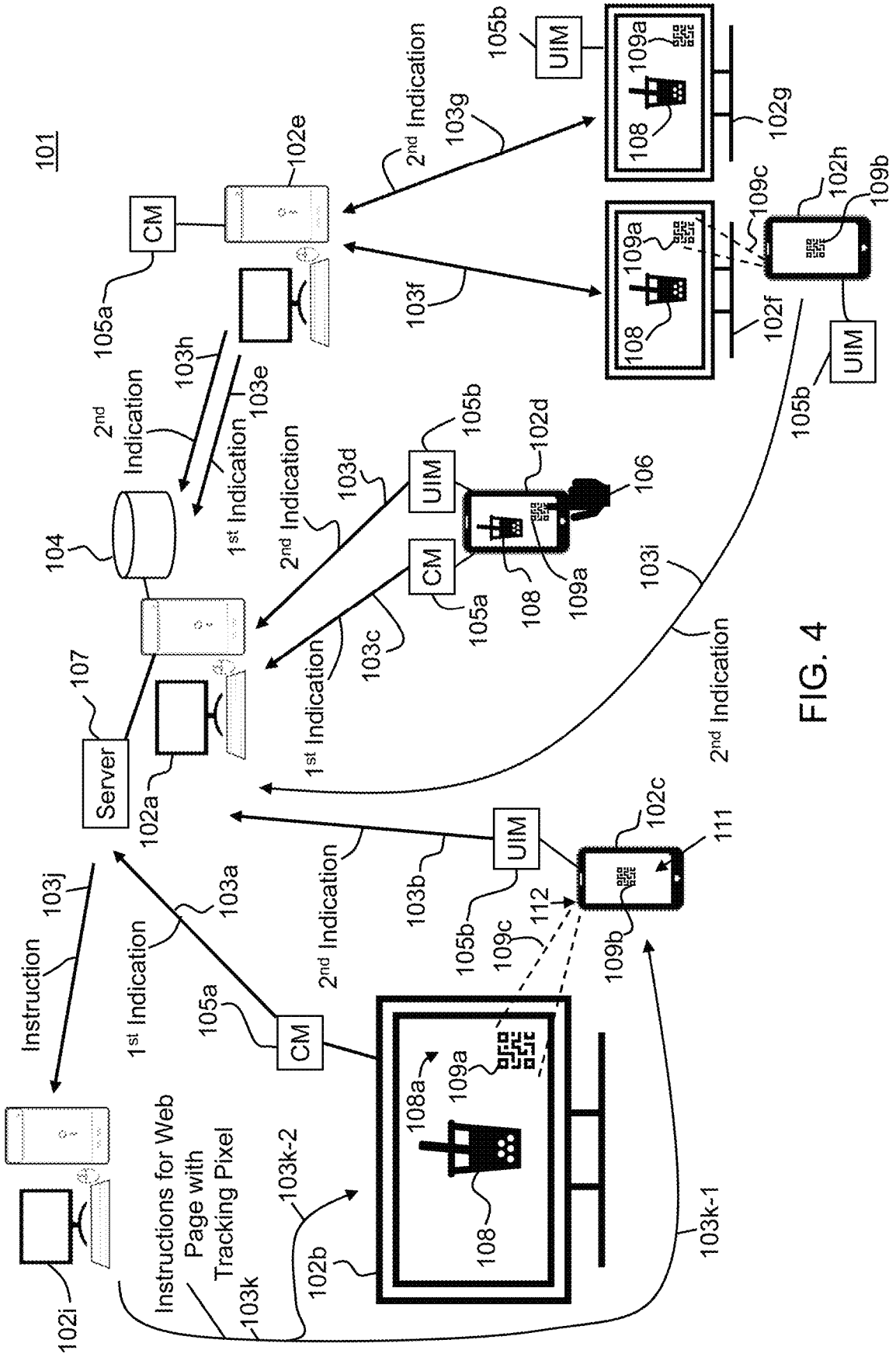
FIG. 4 illustrates at least a portion of a visual indication presentation and interaction processing system including a network of computing devices or device systems, wherein the visual indication presentation and interaction system may be a particular implementation of at least all or part of the computing device system of FIG. 1 or the system of FIG. 3, according to some embodiments of the present invention.

According to various embodiments of the present invention, the system 100 includes some or all of the systems shown in each of at least FIGS. 2, 3, and 4.

FIG. 2 illustrates an example of a computing device system 200, which may be a particular implementation of all or part of the computing device system 100 of FIG. 1, according to some embodiments. In this regard, the system 200 of FIG. 2 may also represent all or a part of a node 102 discussed further below with respect to at least FIGS. 3 and 4, according to some embodiments. The computing device system 200 may include a processor 150, which may correspond to an embodiment of the data processing device system 110 of FIG. 1, in some embodiments. The non-transitory random-access memory 151, input/output (I/O) adapter 156, and non-transitory storage medium, such as a hard disk drive, 157 may correspond to an embodiment of some or all of the processor-accessible memory device system 130 of FIG. 1, according to some embodiments. Although, the I/O adapter 156 may also be considered part of the input-output device system 120 of FIG. 1, according to some embodiments. The user interface adapter 154, mouse 158, keyboard 159, display adapter 155, display 160, and communication interface 152 may correspond to an embodiment of the input-output device system 120 of FIG. 1, according to some embodiments. The communication interface 152 (e.g., an example of all or part of the input-output device system 120) may communicatively connect to a communications network 153 for communicating with other computing device systems 200 or 100, or nodes 102, according to some embodiments.

FIG. 3 shows an example of a system 101, according to various example embodiments. The system 101 may be a particular implementation of all, part, or respective instances of the computing device system 100 of FIG. 1 or 200 in FIG. 2. In some embodiments, the system 101 provides a visual indication presentation and interaction processing system. The system 101 includes a plurality of nodes 102 (six called out as reference parts 102a, 102b, 102c, 102d, 102e, and 102f in the example embodiments shown in FIG. 3). In some embodiments, the computing devices 100 of FIG. 1 and 200 of FIG. 2 may provide each of at least some or all of the nodes 102. In this regard, each node 102 may represent an instance of the computing device 100 or 200, or the computing device 100 may be considered to represent a plurality or all of the nodes 102. The nodes 102 may be communicatively connected to each other using communication channels 103 (for clarity of drawing, not all communication channels are labeled in FIG. 3). Examples of communication systems or communications networks include, but are not limited to, local area networks (LANs), wide area networks (WANs), cellular networks, or the Internet. In some embodiments, the communications network 153 of FIG. 2 may provide the communication channels 103, which may be any communicative connection according to some embodiments. According to some embodiments, the system 101 may include a plurality of nodes 102, each node 102 including a data processing device system (e.g., data processing device system 110), a memory device system (e.g., memory device system 130), and an input-output device system (e.g., input-output device system 120) communicatively connected to a communications network (e.g., network 153), which may provide communication channels 103.

In some embodiments, the system 101 may include a plurality of computing device systems (e.g., 100 or 200) communicatively connected to a communications network (e.g., network 153) (e.g., via input-output device system 120 or communication interface 152). In some embodiments, each respective data processing device system (e.g., 110 or 150) within each node 102 may be communicatively connected to a respective processor-accessible memory device system (e.g., 130, 104 (FIG. 4), or 151, 157, or both 151 and 157) and respective input-output device system (e.g., 120 or 151, 152, 154, 155, 156, 157, 158, 159, 160, or a combination thereof). In some embodiments, each of one or more of the respective processor-accessible memory device systems of the nodes 102 stores a program that configures the respective data processing device system of the node 102 to execute all or a portion of each of one or more of the processes disclosed herein, such as some or all of those described with respect to at least FIG. 5, below.

In some embodiments, the system 101 may be a peer-to-peer (P2P) network. Each node 102 may be directly or indirectly communicatively connected to the other nodes 102 via communication channels 103. The communication channels 103 may be open (unencrypted) or encrypted to provide secure communication between the nodes 102, according to various embodiments. Each node 102 may interact with another node 102, even if the communication path requires the communication to be transmitted via communication channels communicatively connected to an intermediate third node 102. In some embodiments, intermediate nodes in a communication path communicatively connecting two particular nodes 102 may serve as message routers to provide a communications link between two particular nodes 102.

FIG. 4 illustrates all or a portion of a visual indication presentation and interaction processing system 101 including a network of computing devices or device systems, according to some embodiments of the present invention. In some embodiments, the system 101 includes as node 102a a server device system (also referred to as a server device system 102a). Although the phrase "server device system" is used to describe some embodiments of node 102a in FIG. 4, other configurations of node 102a may be implemented on other embodiments. In some embodiments, the server device system 102a may represent an instance of the system 100 of FIG. 1 or the system 200 of FIG. 2. In some embodiments, the server device system executes a server program 107, which may be stored in or by the processor-accessible memory device system 130 or the memory 151 of the server device system 102a, according to some embodiments. FIG. 5, described in more detail below, illustrates, in middle column 550, various configurations of the server program 107 that may configure a data processing device system (e.g., a data processing device system 110) of the server device system 102a to execute various visual indication presentation and interaction processing methods described herein, according to some embodiments of the present invention. In some embodiments, the server device system 102*a* stores in its memory device system (e.g., all or a portion of memory device system 130 in FIG. 1 or memory 151 in FIG. 2) a database 104. FIG. 6 and FIG. 7, described in more detail below, provide some example contents and data structures of the database 104, according to some embodiments.

Although FIG. 4 shows many nodes or device systems 102*a*-102*i* to provide some example configurations, it should be noted that the invention is not limited to any one or more or all of such nodes or device systems or configurations, which are merely provided for purposes of illustration. For example, not all nodes 102 in FIG. 4 are required, according to some embodiments, and some of various embodiments have various combinations or sub combinations of these or other nodes.

FIG. 4 illustrates one example of a first node or first device system 102*b* that may be communicatively connected to the server device system 102*a* via a communicative connection 103*a* (which may be an example of a communication channel 103 from FIG. 3 or any other communicative connection). Although communicative connection 103*a* and other communicative connections in FIG. 4 are illustrated in FIG. 4 with a single-direction arrow, it should be noted that each of one or more or all of such communicative connections may be a bidirectional communicative connection, according to various embodiments.

In some embodiments, the first device system 102*b* may execute or at least be configured to execute a content monitoring ("CM") program 105*a*. FIG. 5, described in more detail below, illustrates, in left column 551, various configurations of the content monitoring program 105*a* that may configure a data processing device system (e.g., a data processing device system 110) of the first device system 102*b* to execute one or more portions of various visual indication presentation and interaction processing methods described herein, according to some embodiments. However, not all blocks in column 551 in FIG. 5 are required to be executed by a content monitoring program 105*a*, according to some embodiments.

In some embodiments, the content monitoring program 105*a* contains detection instructions associated with block 506 that configure the first device system 102*b* (or other device system that is executing the content monitoring program 105*a*) to detect initiation of an observable presentation of a visual indicator. For instance, in some embodiments as illustrated in FIG. 4, the first device system 102*b* may observably present or provide e.g., via a display device system, digital or particular content 108 (commonly referred to below merely as "digital content" herein for simplicity) and an associated visual indicator 109*a*. In some embodiments, the digital content 108 may be part of an advertising campaign in which an advertiser is interested in understanding the effectiveness of such advertising campaign. However, the present invention is not limited to this context, and equally applies in any context in which it is desirable to track, monitor, or promote user engagement with the display of digital content, for example.

In some embodiments, the visual indicator 109*a* may be configured to be more easily presentable than the digital content 108 (e.g., by being a less-complex or smaller image or video than the digital content 108) to facilitate easy detection by the content monitoring program 105*a*, but also, in some embodiments, to attract user or viewer attention or interaction (e.g., by visually standing out such as via visual separation or isolation, color contrast, highlighting, flashing, color variability, boldness, text or accompanying text or image urging user interaction, etc.) compared to the digital content 108 that is desired to be monitored, or compared to a background 108*a* or background image(s) concurrently visually presented by the respective device or device system (e.g., the first device system 102*b* in this example).

In the example of FIG. 4, the digital content 108 to be monitored is an image or video of a beverage advertisement, while the visual indicator 109*a* is a static, visible image representation of a code that, as described in more detail below, may link the visual indicator 109*a* to the digital content 108 in the database 104. However, the present invention is not limited to any particular form of digital content, and other types of visual indicators may be utilized in other embodiments.

In some embodiments, the content monitoring program 105*a* may be configured to monitor all or at least one or more sequences of digital content presented by the first device system (e.g., first device system 102*b* in this present example), to detect the presentation of one or more particular digital content. In some embodiments, the content monitoring program 105*a* may be configured to detect the presence of a type of visual indicator, such as a code, an icon, a stamp, a particular sequence of images, a QR code (as is the example of visual indicator 109*a*), or any other type of image or sequence of images (e.g., video) that has one or more detectable common characteristics that facilitate detection by the content monitoring program 105*a*, according to various embodiments. As described above, however, in some embodiments, the visual indicator (such as visual indicator 109*a*) is more easily or efficiently transmitted, observably presented, or detected than the corresponding digital content 108, and may be configured to attract user or viewer attention or interaction.

In the example of FIG. 4, the content monitoring program 105*a* may be configured to detect or cause detection of, according to program instructions associated with block 506 in FIG. 5, an observable presentation of a QR code (as visual indicator 109*a* in this example) in a predetermined region or regions of the display of the first device system 102*b*, according to some embodiments. By allowing the content monitoring program 105*a* to monitor a predetermined region or regions of the display (e.g., monitoring less than the entire display region), according to some embodiments, the processing load required by the content monitoring program 105*a* may be reduced, as compared to cases where the content monitoring program 105*a* monitors the entire display region.

In response to detection of the observable presentation of the visual indicator 109*a* by a data processing device system (e.g., of first device system 102*b* in this present example) under execution of the content monitoring program 105*a* according to program instructions associated with block 506, such data processing device system may be configured by the content monitoring program 105*a* to transmit a first indication of observable presentation of the visual indicator 109*a* to the server device system 102*a* according to program instructions associated with block 508 in FIG. 5, according to some embodiments. In the example of FIG. 4, the first indication may be transmitted to the server device system 102*a* by the content monitoring program 105*a* executed by the first device system 102*b* via communicative connection 103*a*. In some embodiments, such first indication may include an indication of a code indicated by the visual indication 109*a*. Such a code may be associated, e.g., at least in database 104 in FIG. 4, with particular content that is desired to be monitored, such as a beverage associated with digital content 108 in the example of FIG. 4, which may be the subject of an advertising campaign, according to some embodiments of the present invention. Such a code may also be associated with a unique device identifier associated (e.g., at least in database 104 in FIG. 4) with the device system (e.g., the first device system 102b in this present example) that observably presented the corresponding visual indicator (e.g., the visual indicator 109a in this present example). In some embodiments, the first indication (e.g., transmitted in accordance with program instructions associated with block 508) may include a time or time stamp indicating a time of initiation of the observable presentation of the visual indicator (e.g., the visual indicator 109a in this present example). The first indication may include or indicate other information, according to various embodiments.

In some embodiments, program instructions associated with block 502 in FIG. 5 may configure the server device system 102a to receive the first indication of observable presentation of the visual indicator (e.g., the visual indicator 109a in the present example), which was transmitted according to program instructions associated with block 508. In this regard, a data processing device system (e.g., an instance of or a part of data processing device system 110) of server device system 102a may be configured via a program, such as server program 107, at least to receive from a communicatively connected first device system (e.g., first device system 102b), via an input-output device system (e.g., an instance of or a part of input-output device system 120, such as network or communication interface 152) communicatively connected to a communications network (e.g., FIG. 3 or via communicative connection 103a), a first indication of observable presentation of a visual indicator (e.g., visual indicator 109a). In some embodiments, the first indication is consistent with origination from a content monitoring program (e.g., content monitoring program 105a of first device system 102b) detecting observable presentation of the visual indicator (e.g., visual indicator 109a) via monitoring of device-presented content by the content monitoring program.

In some embodiments, program instructions associated with block 504 in FIG. 5 may configure the server device system 102a to determine particular content associated with the first indication received per block 502 of observable presentation of the visual indicator (e.g., visual indicator 109a). With respect to the example of FIG. 6, in response to receiving the first indication per block 502, the server device system 102a may be configured to build a new entry (e.g., a new row 650 in this present example) in a database, such as database 600. The database 600 may be included in the database 104 shown in FIG. 4. Although the database 600 is illustrated as a two-dimensional table data structure merely for purposes of illustration, it should be noted that the invention is not limited to any particular data structure for any of the databases discussed herein.

The first indication received per block 502 may include or be convertible to define a code, such as code "B36F" in this example, which the server device system 102a may be configured to insert into row 650, column 602, as shown in the example of FIG. 6, according to some embodiments. Such code may be linked to or associated with particular content, identified as "Coffee Brand X" in this example, in the database 104, row 650, column 604. The linkage or association between the code and the particular content is an example of an association between the particular content and the first indication received per block 502. The linkage or association between the code and the particular content may be accomplished by a look-up-table or other data structure in the database 104, according to various embodiments. By accessing such look-up-table or other data structure linking the code and the particular content, the server device system 102a is able to determine, e.g., according to program instructions associated with block 504, the particular content associated with the first indication received per block 502 of observable presentation of the visual indicator (e.g., visual indicator 109a), according to some embodiments. However, the invention is not limited to any particular mechanism by which the server device system 102a determines particular content associated with the received first indication of observable presentation of the visual indicator.

In some embodiments, program instructions associated with block 510 in FIG. 5 may configure the server device system 102a to store, in a processor-accessible memory device system (e.g., in database 600 stored in or by all or part of memory device system 130) and in response to determining that the particular content is associated with the first indication received per block 502 of observable presentation of the visual indicator (e.g., visual indicator 109a), a recorded-presentation indication indicating that the particular content or information indicative of the particular content or associated therewith has been device-presented. For example, according to some embodiments with respect to FIG. 6, such a recorded-presentation indication may be all or part of the new database entry of row 650 in database 600, which the server device system 102a may populate in response to receiving per block 502 the first indication, in some embodiments. For instance, based at least on determining per block 504 that the particular content is associated with the first indication received per block 502, the server device system 102a may be configured to insert such particular content identification into row 650, column 604 in the example of FIG. 6, according to some embodiments, at least as part of building the new database entry (e.g., new row 650) in database 600 in response to receiving the first indication per block 502.

The particular content identification stored in the database 600 may be the same or different than the digital content (e.g., digital content 108) detected by the content monitoring program 105a, according to various embodiments. For example, the particular content identification stored in row 650, column 604 in the database 600 is "Coffee Brand X", whereas the digital content 108 presented by the first device system 102b and detected by the corresponding content monitoring program 105a in FIG. 4 per block 506 is an image or video of or including a beverage. Accordingly, the particular content or the identification thereof in the database 600 may be a description of the digital content 108 or other information associated with or indicative of the digital content 108, according to some embodiments. In this regard, in some embodiments, the particular content (e.g., digital content 108) associated with the first indication (received per block 502 in some embodiments) of observable presentation of the visual indicator (e.g., visual indicator 109a) may be different than the visual indicator.

In some embodiments, the first indication received per block 502 may be associated with (e.g., by database 104) or include an association with (e.g., internally store or represent) a device identifier that identifies the device (e.g., all or a part of first device system 102b in this present example) which observably presented the visual indicator (e.g., visual indicator 109a). In the example of FIG. 6, the device identifier associated with first device system 102b is "7F9J", which the server device system 102a records in row 650, column 606 in the database 600, in this present example. Such a device identifier may be particularly useful to track which device(s) present the digital content 108, according to some embodiments.

In some embodiments, the first indication received per block 502 may include or be associated or transmitted with a time or time stamp of initiation of the observable presentation of the visual indicator 109*a*. In the example of FIG. 6, this time of initiation of the observable presentation of the visual indicator is stored by the server device system 102*a* in row 650, column 608 of the database 600, according to some embodiments.

In some embodiments, the first indication received per block 502 may include or be associated or transmitted with an opening of or a duration of an offer period or window. For example, at least in some embodiments where the particular content (e.g., row 650, column 604) and the associated digital content 108 is part of an advertising campaign, it may be beneficial to encourage user interaction or engagement with the content. For instance, it may be beneficial, in some contexts and embodiments, to provide a user or viewer with a special offer to purchase one or more products or services associated with the particular content or digital content 108, upon presentation of the digital content 108 by the first device system (e.g., first device system 102*b*). For example, in association with presentation of the beverage image or video of digital content 108 by first device system 102*b*, a user or viewer of the display of first device system 102*b* may be offered a special discount on purchasing such a beverage for certain period of time, according to some embodiments. In some embodiments, the period of time may begin with the presentation of the digital content 108. For instance, when an advertisement for the beverage of digital content 108 is presented, a user or viewer may be provided with an opportunity to purchase such a beverage at a discount for the next hour. As will be described in more detail below, this offer may be accepted by the user or viewer by interacting with the associated visual indication 109*a*. FIG. 6 works from this example, such that the server device system 102*a* may be configured, according to some embodiments, to determine an expiration time of the offer by adding an hour to the start of presentation time recorded in row 650, column 608 and storing, e.g., pursuant to program instructions associated with block 510, a result of that determination in the offer expiration time column 614 for corresponding row 650, as shown in FIG. 6. In this regard, the offer expiration time recorded in column 614 at least for corresponding row 650 is an example of an offer-available time, although other manners of recording an offer-available time may be utilized in other embodiments.

In other words, in some embodiments, a data processing device system (e.g., all or part of data processing device system 110) of the server device system 102*a* may be configured by program instructions associated with block 504 in FIG. 5, e.g., via the server program 107, at least to determine, based at least on an analysis of the time of initiation of the observable presentation (e.g., the time of initiation recorded in row 650, column 608 in database 600) of the visual indicator (e.g., visual indicator 109*a*), an offer-available time indication (e.g., the time recorded in row 650, column 614 in database 600) indicating a time in which an offer is available, and to store, in the processor-accessible memory device system in association with the recorded-presentation indication (e.g., at least part of row 650, such as the start of presentation time in row 650, column 608) indicating that the particular content has been device-presented, the determined offer-available time indication (e.g., the time recorded in row 650, column 614 in database 600). The determined offer-available time indication may indicate the time in which the offer is available.

According to some embodiments, as illustrated with respect to FIG. 4, a second device system, such as second device system 102*c*, may be configured to interact with the observably presented visual indicator 109*a* observably presented by first device system 102*b*. As illustrated by second device system 102*c*, the second device system may be distinct (e.g., physically separated, within distinct housings, governed by different processors, separated by a network connection, or combinations thereof, according to some embodiments) from the first device system (e.g., first device system 102*b*), the server device system (e.g., server device system 102*a*), or both the first device system and the server device system, according to some embodiments.

In some embodiments, the second device system (e.g., such as second device system 102*c*), or a data processing device system thereof, may be configured by a user interface monitoring program 105*b*, which may be stored on a memory device system (e.g., all or part of memory device system 130) of the second device system, to detect, according to program instructions associated with block 514 in FIG. 5, an interaction with the observably presented visual indicator (e.g., visual indicator 109*a*). The user interface monitoring program 105*b* is an example of a different program than the content monitoring program 105*a*, according to some embodiments. In the illustrated example case of second device system 102*c* in FIG. 4, the user interface monitoring ("UIM") program 105*b* configures the second device system 102*c* to analyze an image 111 captured (represented by reference 109*c*) by a camera system 112 of the second device system 102*c* to determine if the captured image is at least in part of the visual representation 109*a*. For example, if the second device system 102*c*, under control or execution of the user interface monitoring program 105*b*, detects that the user of the second device system 102*c* photographs or captures an image 111 of the visual indicator 109*a*, the second device system 102*c*, under control or execution of the user interface monitoring program 105*b*, may then be configured to determine or detect per block 514 that the user has interacted with the visual indicator 109*a*. In this regard, the user interaction may include a photographing of the visual indicator 109*a* at a device 102*c* different than a device 102*b* that provides the observable presentation of the visual indicator 109*a*, according to some embodiments. Also in this regard, the observable presentation of the visual indicator 109*a* by the first device system (e.g., first device system 102*b*) may be considered a first observable presentation of the visual indicator (e.g., visual indicator 109*a*), while a displayed image (e.g., displayed image 111) of the visual indicator displayed by the second device system (e.g., second device system 102*c*) may be considered a second observable presentation 109*b* of the visual indicator, according to some embodiments. In some embodiments, the second device system (e.g., second device system 102*c*) may be configured by the user interface monitoring program 105*b* at least to analyze an image (e.g., image 111) captured by a camera system (e.g., camera system 112) of the second device system 102*c*, where the image includes the second observable presentation (e.g., second observable presentation 109*b*) of the visual indicator (e.g., visual indicator 109*a*).

In response to detection of the user interaction with the visual indicator 109*a* by a data processing device system (e.g., of second device system 102*c* in this present example) under execution of the user interface monitoring program 105*b* according to program instructions associated with block 514, such data processing device system may be configured by the user interface monitoring program 105*b* per program instructions associated with block 516 to transmit a second indication (e.g., in contrast to the above-discussed first indication per blocks 508 and 502) of the user interaction with the visual indicator (e.g., visual indicator 109*a*), according to some embodiments. The second indication may be consistent with origination from a different program, such as the user interface monitoring program 105*b*, distinct from the content monitoring program 105*a*, according to some embodiments. In the example of FIG. 4, the second indication may be transmitted to the server device system 102*a* by the user interface monitoring program 105*b* executed by the second device system 102*c* via communicative connection 103*b*. In some embodiments, such second indication (e.g., transmitted in accordance with program instructions associated with block 516) may include or be transmitted contemporaneously with a user interaction time indication indicating a time or time stamp of the user interaction with the visual indicator (e.g., the visual indicator 109*a* in this present example). The second indication may include, indicate, or be transmitted contemporaneously with other information, according to various embodiments.

In some embodiments, program instructions associated with block 512 in FIG. 5 may configure the server device system 102*a* to receive the second indication of a user interaction with the visual indicator (e.g., the visual indicator 109*a* in the present example), which was transmitted according to program instructions associated with block 516. In this regard, a data processing device system (e.g., an instance of or a part of data processing device system 110) of server device system 102*a* may be configured via a program, such as server program 107, at least to receive from a communicatively connected second device system (e.g., second device system 102*c* in this example), via an input-output device system (e.g., an instance of or a part of input-output device system 120, such as network or communication interface 152) communicatively connected to a communications network (e.g., FIG. 3 or via communicative connection 103*b*), a second indication of a user interaction with the visual indicator (e.g., visual indicator 109*a*), according to some embodiments. The second indication may be consistent with origination from a different program, such as the user interface monitoring program 105*b*, distinct from the content monitoring program (e.g., content monitoring program 105*a*), according to some embodiments.

In some embodiments, the second indication may include or be received per block 512 contemporaneously with a user interaction time indication indicating a time or time stamp of the user interaction with the visual indicator (e.g., the visual indicator 109*a* in this present example). In this regard, a data processing device system (e.g., an instance of or a part of data processing device system 110) of server device system 102*a* may be configured via a program, such as server program 107, at least to receive from a communicatively connected second device system (e.g., second device system 102*c*), via an input-output device system (e.g., an instance of or a part of input-output device system 120, such as network or communication interface 152) communicatively connected to a communications network (e.g., FIG. 3 or via communicative connection 103*b*), a user interaction time indication indicating a time of user interaction with the visual indicator (e.g., visual indicator 109*a*).

In some embodiments, program instructions associated with block 518 in FIG. 5 may configure the server device system 102*a* to determine that the particular content (e.g., determined per block 504) is associated with the second indication of a user interaction with the visual indicator (e.g., visual indicator 109*a*). With respect to the example of FIG. 6, in response to receiving the second indication per block 512, the server device system 102*a* may be configured to further populate the previously-generated entry (e.g., row 650 in this present example) in database 600 in response to the determination.

For example, the second indication received per block 512 may include or be convertible to define a code, such as code "B36F", which the server device system 102*a* may be configured to determine matches the code in row 650, column 602, according to some embodiments, which may permit the server device system 102*a* to determine that the received second indication is associated with the particular content in row 650, column 604, according to some embodiments. However, other manners of determining association between the particular content and the received second indication of the user interaction with the visual indicator may be implemented according to various embodiments. For example, as discussed above, such code may be otherwise linked to or associated with the particular content in the database 104.

In some embodiments, program instructions associated with block 520 in FIG. 5 may configure the server device system 102*a* to store, in a processor-accessible memory device system (e.g., in database 600 stored in or by all or part of memory device system 130) and in response to determining that the particular content is associated with the second indication of user interaction with the visual indicator (e.g., visual indicator 109*a*), an interaction indication indicating that the particular content or information associated therewith, such as the visual indicator 109*a*, has been interacted with by a user or viewer. For example, according to some embodiments with respect to FIG. 6, such a stored indication of user interaction may be all or part of the previously-generated new database entry (e.g., previously generated per block 510 in some embodiments), such as the database entry of row 650 in database 600, which the server device system 102*a* may further populate according to program instructions associated with block 520 in response to receiving the second indication, in some embodiments. For instance, based at least on determining that the particular content is associated with the received second indication per block 518, the server device system 102*a* may be configured to populate one or more of columns 616, 618, 620, and 622 into the respective database entry (e.g., row 650 of database 600 in this example) based on information in the second indication received per block 512.

In some embodiments, the second indication received per block 512 may be associated with (e.g., by database 104) or include an association with (e.g., internally store or represent) a device identifier that identifies the device (e.g., all or a part of second device system 102*c* in this present example) which detected (e.g., per block 514) the user interaction with the visual indicator (e.g., visual indicator 109*a*). In the example of FIG. 6, the device identifier associated with second device system 102*c* is "KL24", which the server device system 102*a* records in row 650, column 616 in the database 600, in this present example.

In some embodiments, the second indication received per block 512 may be associated with (e.g., by database 104) or include an association with (e.g., internally store or represent) a time or time stamp of the user interaction with the visual indicator (e.g., the visual indicator 109*a* in this present example). In the example of FIG. 6, this time of the user interaction with the visual indicator is stored by the server device system 102*a* in row 650, column 618 of the database 600, according to some embodiments.

In some embodiments, the server device system 102a may be configured, according to program instructions associated with block 518, at least to determine, based at least on an analysis of the time of initiation of the observable presentation of the visual indicator (e.g., row 650, column 608 in FIG. 6) and the user interaction time indication indicating the time of user interaction with the visual indicator (e.g., row 650, column 618 in FIG. 6), a duration of elapsed time until occurrence of the user interaction with the visual indicator (e.g., the visual indicator 109a). In some embodiments, the duration of elapsed time until occurrence of the user interaction with the visual indicator may be determined as a difference between the time of initiation of the observable presentation of the visual indicator (e.g., row 650, column 608 in FIG. 6) and the user interaction time indication indicating the time of user interaction with the visual indicator (e.g., row 650, column 618 in FIG. 6). The duration of elapsed time until occurrence of the user interaction with the visual indicator may be stored or recorded in the database 600 (e.g., in row 650, column 620) by the server device system 102a as an elapsed time indication or elapsed time information, according to program instructions associated with block 520. In this regard, the server device system 102a may be configured, according to program instructions associated with block 520, at least to store, in a processor-accessible memory device system (e.g., in database 600 stored in or by all or part of memory device system 130) and in association with the recorded-presentation indication (e.g., at least part of row 650, such as the start of presentation time in row 650, column 608) indicating that the particular content has been device-presented, a user interaction elapsed time indication (e.g., in row 650, column 620) indicating the determined duration of elapsed time until occurrence of the user interaction with the visual indicator (e.g., the visual indicator 109a). Such elapsed time information may be particularly beneficial, e.g., at least for an advertiser to understand how long it took for a user or viewer to interact with an advertisement (e.g., via interacting with the visual indicator 109a) after the advertisement began. Shorter times may indicate greater user or viewer excitement over the advertised product or service.

In some embodiments, the server device system 102a (e.g., a data processing device system thereof) may be configured by a program (e.g., the server program 107 in some embodiments) including program instructions associated with block 518 to utilize the time of user interaction, which may be included in the second indication received per block 512, to determine whether the user or viewer has validly accepted an offer within the corresponding offer-available time stored (e.g., at row 650, column 614 in database 600) per block 510. For instance, the server device system 102a may be configured to determine, according to program instructions associated with block 518 in FIG. 5, whether the user interaction time in row 650, column 618 is before the offer expiration time in row 650, column 614 and, in some embodiments, after the start of presentation time in row 650, column 608. In the example of row 650 in FIG. 6, this condition is met, and the server device system 102a may, consequently, be configured to associate the user interaction with an acceptance of the corresponding offer and to store or record a corresponding offer-acceptance indication according to program instructions associated with block 520, according to some embodiments. In the example of FIG. 6, this offer-acceptance indication is represented by the value of "Yes" stored at row 650, column 622 in database 600, indicating that the offer has been accepted.

In other words, in some embodiments, a data processing device system (e.g., all or part of data processing device system 110) of the server device system 102a may be configured, via, e.g., the server program 107, at least to determine, based at least on an analysis of the time in which the offer is available (e.g., the offer expiration time in row 650, column 614 in database 600 in FIG. 6) and the time of user interaction (e.g., the user interaction time in row 650, column 618 in database 600 in FIG. 6), an offer-acceptance indication indicating that the offer is accepted by the user interaction; and to store, in the processor-accessible memory device system, the offer-acceptance indication (e.g., the "Yes" value in row 650, column 622 in database 600 in FIG. 6).

In some embodiments, in response to determining the offer-acceptance indication (e.g., indicating that the offer has been accepted by the user interaction per the value of "Yes" in row 650, column 622 in this example), the server device system 102a (e.g., a data processing device system thereof) may be configured by a program (e.g., by program instructions of the server program 107 associated with block 522 in FIG. 5) at least to transmit an instruction (i.e., a set of one or more instructions) to execute a provision of a product, service, or both a product and service via an input-output device system (e.g., all or part of the input-output device system 120) of the server device system 102a communicatively connected to a communications network (e.g., via communicative connection 103j in the example of FIG. 4). For example, with respect to FIGS. 4 and 6, in response to determining that the user interaction time at row 650, column 618 at second device system 102c is within the offer-available period (before the time of row 650, column 614), the server device system 102a may be configured to transmit, according to program instructions associated with block 522, an instruction to a third data processing device system 102i via a communicative connection 103j therewith for the third data processing device system 102i to provide the user of second device system 102c (or some other user or individual in other embodiments) with a product or service associated with the digital content 108 visually presented by the first device system 102b. This configuration reveals yet another benefit of the system architecture of at least FIG. 4 where, not only are observable presentations of digital content 108 detected, but also user interactions with such digital content are detected. By detecting both presentations and user interactions with such digital content 108 (e.g., via user interaction with the proxy visual indicator 109a), various embodiments of the present inventive system architecture may be configured to efficiently provide products or services to the user or viewer who interacted with such digital content, according to some embodiments of the present invention. In some embodiments, this provision of products or services, or instructions to provide such products or services per block 522, may indicate a completion or fulfillment of the offer and acceptance represented, for example, by the "Yes" indication stored in row 650, column 622 in database 600. Although the above example discusses the server device system 102a transmitting an instruction to the third data processing device system 102i to provide the product or service, the server device system 102a or some other device system (e.g., first device system 102b or second device system 102c) may, in some embodiments, provide the product or service itself, or instruct another device system in addition to or instead of the third device system 102i to provide the product or service, according to various embodiments.

In some embodiments, the user interaction with the visual indicator 109a leads to the provision of supplemental content or information associated with the digital content 108 or the particular content e.g., per row 650, column 604 in database 600. For instance, the server device system 102a may be configured by program instructions associated with block 522 to transmit an instruction (i.e., a set of one or more instructions) to a third device system (e.g., third device system 102i via a communicative connection 103j in FIG. 4) to provide such supplemental content or information to the user or viewer of first device system 102b, second device system 102c, or both (or some other user or individual of the same or different device system in other embodiments). The supplemental content may provide additional information or the ability to purchase related products or services associated with the digital content 108 or the associated particular content (e.g., row 650, column 604 in database 600).

In some embodiments, such supplemental content or information is the provision of a web page that provides that additional information or purchasing opportunities to the first device system, the second device system, or both the first device system and the second device system. In this regard, in some embodiments, a data processing device system (e.g., all or part of data processing device system 110) of the server device system 102a may be configured, e.g., via the server program 107, at least to transmit to a third device system (e.g., third device system 102i in the example of FIG. 4), in response to determining that the particular content (e.g., the content of row 650, column 604 in database 600) is associated (e.g., per block 518) with the second indication received per block 512 of the user interaction with the visual indicator (e.g., visual indicator 109a) and via an input-output device system (e.g., all or part of the input-output device system 120) of the server device system 102a communicatively connected to a communications network (e.g., via communicative connection 103j), an instruction to visually present a web page associated with the particular content.

In the example of FIG. 4, in response to receipt of the instruction to provide the supplemental content or information from the server device system 102a, the third device system 102i may be configured by program instructions to provide an instruction (i.e., a set of one or more instructions) for the presentation of the web page, via a communicative connection 103k, to the first device system 102b (via communicative connection branch 103k-2), the second device system 102c (via communicative connection branch 103k-1) or both the first device system 102b and the second device system 102c, according to some embodiments. In this regard, the user interaction detected at second device system 102c may cause the provision of supplemental content at first device system 102b, which visually presented the digital content 108 and observably presented the visual indicator 109a. In some embodiments, the web page includes a tracking pixel configured to track a user's visit to or activity at the web page, to provide even more information, for example, to an advertiser about the advertiser's associated advertising campaign.

Although the above example discusses the server device system 102a transmitting an instruction to the third data processing device system 102i to provide the supplemental content or information, the server device system 102a or some other device system (e.g., first device system 102b or second device system 102c) may, in some embodiments, provide the supplemental content or information itself, or instruct another device system in addition to or instead of the third device system 102i to provide the supplemental content or information, according to various embodiments.

In some embodiments, the third device system and at least the second device system are implemented as a same system (e.g., configurations of the third device system 102i and the second device system 102c may be combined into a same device system), such that, e.g., the same device system provides the second indication (e.g., provided per block 516 in FIG. 5) of the user interaction with the visual indicator and presents the web page associated with the particular content, which may include the tracking pixel configured to track the user's visit to the web page. For example, in some embodiments, at least the device system 102c, device system 102d, device system 102g, or device system 102h may be configured by program instructions to provide the second indication (e.g., provided per block 516 in FIG. 5) of the user interaction with the visual indicator and present the web page associated with the particular content including the tracking pixel configured to track the user's visit to the web page.

In some embodiments, the third device system and at least the first device system are implemented as a same system (e.g., configurations of the third device system 102i and the first device system 102b may be combined into a same device system), such that the same device system provides the first indication (e.g., provided per block 508 in FIG. 5) of the observable presentation of the visual indicator and presents the web page associated with the particular content including the tracking pixel configured to track the user's visit to the web page. For example, in some embodiments, at least the device system 102b or device system 102d may be configured by program instructions to provide the first indication (e.g., provided per block 508 in FIG. 5) of the observable presentation of the visual indicator and present the web page associated with the particular content including the tracking pixel configured to track the user's visit to the web page.

According to some embodiments, the content monitoring program 105a executed by the first device system (e.g., first device system 102b) may configure the first device system according to program instructions associated with block 526 in FIG. 5 to detect a time of conclusion of the observable presentation of the visual indicator (e.g., visual indicator 109a). The content monitoring program 105a may also configure the first device system (e.g., first device system 102b) via program instructions associated with block 528 to transmit to the server device system 102a (e.g., via communicative connection 103a) a conclusion time indication indicating a time of conclusion of the observable presentation of the visual indicator. This time of conclusion of the observable presentation of the visual indicator 109a may coincide with the time of conclusion of presentation of the digital content 108, according to some embodiments. However, in other embodiments it may be preferable to extend the duration of display of the observable presentation of the visual indicator 109a beyond conclusion of the presentation of the digital content 108. For example, in at least some cases, it may be preferable to allow a user or viewer more time to interact with the visual indicator 109a, after termination of presentation of the digital content 108, to learn more about or purchase products or services associated with the digital content 108. For instance, the presentation of the digital content 108 may occur for 30 seconds, but it may be preferable to allow the visual indicator 109a to remain observably presented beyond such 30 seconds (even into the display of subsequently unrelated digital content) to allow the user or viewer more time to engage with the digital content 108.

In some embodiments, the server device system 102a may be configured by program instructions (e.g., which may be program instructions of the server program 107 in some embodiments) associated with block 524 to receive, from the first device system (e.g., first device system 102b in this example), via the input-output device system (e.g., all or part of the input-output device system 120) communicatively connected to the communications network (e.g., via communicative connection 103a in some embodiments), the conclusion time indication transmitted by the first device system according to program instructions associated with block 528. This conclusion time indication or a derivative thereof may be stored or recorded, for example, in row 650, column 610 in database 600, according to some embodiments. According to some embodiments, the server device system 102a may be configured by program instructions (e.g., which may be program instructions of the server program 107 in some embodiments) associated with block 530 to determine, based at least on an analysis of the time of initiation (e.g., received per block 502 in some embodiments) of the observable presentation of the visual indicator (e.g., visual indicator 109a) and the time of conclusion (e.g., received per block 524 in some embodiments) of the observable presentation of the visual indicator, a duration of time of the observable presentation of the visual indicator (e.g., visual indicator 109a). For example, such duration of time may be determined by the server device system 102a at least by determining the difference between the end of presentation time stored in, e.g., row 650, column 610 and the start of presentation time stored in, e.g., row 650, column 608 in database 610, according to some embodiments. In some embodiments, the server device system 102a is configured by program instructions (e.g., which may be program instructions of the server program 107 in some embodiments) associated with block 532 to store, in a processor-accessible memory device system (e.g., all or part of the memory device system 130), and in association with the recorded-presentation indication (e.g., stored per block 510) indicating that the particular content has been device-presented, a duration indication indicating the duration determined according to program instructions associated with block 530. For example, such determined duration of presentation of the visual indicator 109a may be stored or recorded in row 650, column 612 in database 600, in association with the recorded-presentation indication exemplified by the existence of row 650, which indicates that the particular content of row 650, column 604 has been device-presented, according to some embodiments. The duration indication stored, e.g., in row 650, column 612 may indicate the duration of time of the observable presentation of the visual indicator, determined per block 530.

Some or all of the methods and processes of FIG. 5 may be repeated for each observable presentation of a visual indicator, such as visual indicator 109a, with each observable presentation resulting in an additional row in database 600, according to some embodiments. For example, row 652 may represent a recorded-presentation indication for the observable presentation of the visual indicator 109a at another "first device system" besides first device system 102b. For example, the device identifier in row 652, column 606 may be associated with another "first" device system 102d shown in FIG. 4, such that row 652 represents an observable presentation of the visual indicator 109a at first device system 102d. In this regard, the transmission of the first indication by such first device system 102d per block 508 may occur via communicative connection 103c with the server device system 102a. The observable presentation indicated by row 652 shows that no user interaction has occurred by the "Null" values in each of column 618, 620, and 622 of row 652 in database 600. This circumstance may either indicate that a user or viewer never interacted with the visual indicator 109a or that a user or viewer has not yet interacted with the visual indicator 109a as of the state of the database 600 illustrated in FIG. 6, according to some embodiments.

In the example of FIG. 4, the first device system 102d may, for example, be a smart phone in contrast to the television represented as first device system 102b, such that the smart phone first device system 102d observably presents both the digital content 108 and the visual indicator 109a, as does the television of first device system 102b.

The example of device system 102d also illustrates that the same device system may be configured as both the "first device system" 551 and the "second device system" 552 by executing both the content monitoring ("CM") program 105a and the user interface monitoring ("UIM") program 105b, such that the same device system executes the actions of both columns 551 and 552 and FIG. 5, according to some embodiments. For example, the device system 102d may be configured as both the first device system and the second device system, such that the same device system (e.g., device system 102d) provides the first indication (e.g., first indication via communicative connection 103c) of observable presentation of the visual indicator (e.g., visual indicator 109a) and provides the second indication (e.g., second indication via communicative connection 103d) of the user interaction with the visual indicator, according to some embodiments. (The communicative connection 103c and the communicative connection 103d may be the same communicative connection in some embodiments.) In this regard, in some embodiments, the same device system (e.g., device system 102d) may execute the content monitoring program 105a and a different program distinct from the content monitoring program, such as the user interface monitoring program 105b.

It may be beneficial in various contexts to either have the same device system execute both the content monitoring program 105a and user interface monitoring program 105b, or to have different device systems execute the content monitoring program 105a and user interface monitoring program 105b, respectively. With respect to device system 102d, which is illustrated as a smart phone with a touchscreen, user interaction with the visual indicator 109a may occur via a user touching (represented as hand touch 106 in FIG. 4) the visual indicator 109a, in contrast to the camera acquisition of an image of the visual indicator 109a discussed above in the example of device systems 102c and 102b. In this regard, the user interaction may include or be a touching of a display region of a touch-enabled display device that provides the observable presentation of the visual indicator, e.g., as illustrated in FIG. 4 with respect to device system 102d, according to some embodiments. In some embodiments, the observable presentation of the visual indicator (e.g., visual indicator 109a) and the user interaction (e.g., via touchscreen) with the visual indicator may occur at the same device system (e.g., device system 102d). Touchscreen interaction with the visual indicator 109a may be particularly suitable in some contexts in which the same device system operates both the content monitoring program 105a and the user interface monitoring program 105b, such that it may be difficult for the same device system to capture an image of its own screen, although the user interaction may also occur in such circumstances utilizing a screen image capture process, where a device captures an image of its own screen. Further in this regard, if the television 102b is equipped with a touchscreen, user interaction with the visual indicator 109a may occur at the television 102b via a user touching the visual indicator 109a in addition to or in lieu of capturing an image of the visual indicator 109a. Accordingly, it can be seen that different embodiments of the present invention utilize different manners of user interaction with the visual indicator 109a for different benefits in different contexts, and the invention as a whole is not limited to any particular user interaction technique.

FIG. 4 also illustrates different examples where the content monitoring program 105a is operated by a first device system 102e that monitors the content of a plurality of device systems 102f, 102g that are distinct from each other and distinct from the first device system 102e. Such an architecture may be beneficial in some contexts to allow a single device system, such as first device system 102e, to monitor the content of multiple devices. In some embodiments, the first device system 102e also provides content to the device systems 102f, 102g, such that the first device system 102e may be deemed a digital content provider to device systems 102f, 102g, thereby allowing the content providing device system 102e to efficiently monitor the content of device systems 102f, 102g (since it is the device providing the content). Further, in some embodiments, the device system 102e may be combined with the server device system 102a, such that the same device system executes some or all of the actions or functions of both of columns 550 and 551 of the methods of FIG. 5. In other words, in some embodiments, the server device system 102a may execute or be configured to execute the content monitoring program 105a. In some embodiments, the same device system may execute or be configured to execute the actions of all or part of columns 550, 551, and 552 of the methods of FIG. 5.

Continuing with the example of first device system 102e, such device system 102e may monitor content presented by the device systems 102f, 102g via respective communicative connections 103f, 103g. In response to the content monitoring program 105a executed by the first device system 102e detecting observable presentation of the visual indicator 109a at one or both of the device systems 102f, 102g, the first device system 102e may be configured to transmit the corresponding first indication(s) per block 508 to the server device system 102a via communicative connection 103e. In at least some embodiments where the functions of device system 102e and device system 102a are combined, however, such first indication(s) need not be transmitted through a communications network and may instead be transmitted internally within the device system.

The device system 102f may merely passively display content served to it e.g., from first device system 102e, in some embodiments. On the other hand, device system 102g may be a "second device system" that executes the user interface monitoring program 105b to record user interactions (e.g., via a touchscreen) with the visual indicator 109a and to transmit corresponding second indications per block 516 in FIG. 5 to the device system 102e via communicative connection 103g. Under this architecture, the device system 102e may merely forward or pass along the second indications to the server device system 102a via communicative connection 103h (which may or may not be the same as communicative connection 102e), according to some embodiments. In at least some embodiments where the functions of device system 102e and device system 102a are combined, however, such forwarding would be unnecessary. In some embodiments, device systems 102f, 102g may communicate directly with server device system 102a instead of through device system 102e.

In the case of a passive device system 102f that does not execute the content monitoring program 105a or the user interface monitoring program 105b, device system 102h may act as the "second device system" in the same manner as described above with respect to second device system 102c with respect to device system 102b. In this regard, the second device system 102h may execute the user interface monitoring program 105b to configure such device system 102h to transmit its second indications to the server device system 102a via communicative connection 103i.

FIG. 7 illustrates some examples of cumulative information that is possible to be efficiently produced due to the effectiveness of the various system architectures described above. Such cumulative information may be particularly beneficial at least for advertisers in evaluating the effectiveness of their advertising campaigns. In particular, FIG. 7 illustrates cumulative information producible, for example, by the server device system 102a by compiling information such as that recorded in database 600 in FIG. 6, according to some embodiments. In FIG. 7, row 750 illustrates cumulative information associated with cumulative observable presentations of a visual indicator associated with code "B36F" (shown in row 750, column 702 in database 700), which corresponds to the same code in column 602, rows 650, 652 in FIG. 6. Accordingly, row 750 in FIG. 7 may represent cumulative information for an advertising campaign for the particular content "Coffee Brand X", as shown in row 750, column 704. Column 706 of row 750 shows a total number of presentations of the particular content (or associated digital content 108), which may be determined by summing the total number of rows in the database 600 associated with the code "B36F". Column 708 of row 750 shows a total number of user interactions with the particular content (or associated digital content 108), which may be determined by summing the total number of rows in the database 600 associated with the code "B36F" that, e.g., have a non-Null value in at least column 618 ("User Interaction Time), indicating that the content was interacted with by a user. The average time until the user interacted with the particular content (or associated digital content 108), illustrated in row 750, column 710 may be determined by the server device system 102a averaging the elapsed time until user interactions from column 620 for the rows in database 600 associated with code "B36F" that do not have a "Null" value in, e.g., column 618. The percentage interactions to purchase in row 750, column 712 may represent a ratio of the number of rows in database 600 associated with code "B36F" that exhibit a value of "Yes" in the "Offer Accepted" column 622 to the number of rows in database 600 associated with the code "B36F" that have a non-Null value for, e.g., column 618, to indicate the percentage of user interactions with the particular content (or associated digital content 108) that resulted in the user accepting an offer for the content, e.g., by purchasing the content. Row 752 in FIG. 7 may illustrate cumulative information associated with cumulative observable presentations of a visual indicator associated with code "B36G" (shown in row 752, column 702 in database 700), which may be associated with a different advertising campaign than that summarized by row 750, according to some embodiments.

Subsets or combinations of various embodiments described above provide further embodiments. These and other changes can be made to various embodiments in light of the above-detailed description. In general, the terms used should not be construed to limit the invention to the specific embodiments disclosed in the specification and the claims, but should be construed to include other systems in accordance with any claims. Further, it should be noted that, although several of the above-discussed embodiments are described within the context of an advertising system, other embodiments apply to other systems, such as at least content monitoring or engagement systems, where one or more of the above-described advantages or features will prove beneficial. Accordingly, the invention is not limited by this disclosure, but instead its scope is to be determined entirely by the claims.

What is claimed is:

1. A system comprising:

a data processing device system;

a processor-accessible memory device system communicatively connected to the data processing device system; and an input-output device system communicatively connected to the data processing device system and a communications network, wherein the data processing device system is configured, via a program stored in the processor-accessible memory device system, at least to:

receive, via the communications network and the input-output device system, from a first device system, a first indication of observable presentation of a visual indicator, the first indication consistent with origination from a content monitoring program detecting observable presentation of the visual indicator via monitoring of device-presented content by the content monitoring program, determine particular content associated with the received first indication of observable presentation of the visual indicator, store, in the processor-accessible memory device system and in response to determining that the particular content is associated with the received first indication of observable presentation of the visual indicator, a recorded-presentation indication indicating that the particular content or information associated therewith has been device-presented, receive, via the communications network and the input-output device system, from a second device system, a second indication of a user interaction with the visual indicator, the second indication consistent with origination from a different program distinct from the content monitoring program, the second device system distinct from the first device system, determine that the particular content is associated with the received second indication of the user interaction with the visual indicator, and store, in the processor-accessible memory device system and in response to determining that the particular content is associated with the received second indication of the user interaction with the visual indicator, an interaction indication that the particular content has been interacted with by a user, wherein the observable presentation of the visual indicator is a first observable presentation of the visual indicator, and wherein the second device system is configured by the different program at least to analyze an image of the visual indicator captured by a camera system of the second device system, the image including a second observable presentation of the visual indicator.

2. The system of claim 1, wherein the particular content associated with the received first indication of observable presentation of the visual indicator is different than the visual indicator.

3. The system of claim 1, wherein the visual indicator is a static, visible image representation of a code.

4. The system of claim 1, wherein the first indication of observable presentation of the visual indicator includes a time stamp indicating a time of initiation of the first observable presentation of the visual indicator.

5. The system of claim 4, wherein the data processing device system is configured, via the program stored in the processor-accessible memory device system, at least to:

receive from the first device system, via the communications network and the input-output device system, a conclusion time indication indicating a time of conclusion of the first observable presentation of the visual indicator;

determine, based at least on an analysis of the time of initiation of the first observable presentation of the visual indicator and the time of conclusion of the first observable presentation of the visual indicator, a duration of time of the first observable presentation of the visual indicator; and store, in the processor-accessible memory device system in association with the recorded-presentation indication indicating that the particular content has been device-presented, a duration indication indicating the determined duration of time of the first observable presentation of the visual indicator.

6. The system of claim 1, wherein the data processing device system is configured, via the program stored in the processor-accessible memory device system, at least to transmit to a third device system, in response to determining that the particular content is associated with the received second indication of the user interaction with the visual indicator and via the communications network and the input-output device system, an instruction to visually present a web page associated with the particular content including a tracking pixel configured to track a user's visit to the web page.

7. The system of claim 6, wherein the third device system is the second device system, such that the third device system and the second device system are the same device system, and such that the same device system provides the second indication of the user interaction with the visual indicator and presents the web page associated with the particular content including the tracking pixel configured to track the user's visit to the web page.

8. The system of claim 6, wherein the third device system is the first device system, such that the third device system and the first device system are the same device system, and such that the same device system provides the first indication of the observable presentation of the visual indicator and presents the web page associated with the particular content including the tracking pixel configured to track the user's visit to the web page.

9. The system of claim 1, wherein the first device system executes the content monitoring program and provides the first observable presentation of the visual indicator via a display device system of the first device system.

10. The system of claim 1, wherein the user interaction includes a photographing of the visual indicator at a device different than a device that provides the first observable presentation of the visual indicator.

11. The system of claim 1, wherein the user interaction includes a touching of a display region of a touch-enabled display device that provides the first observable presentation of the visual indicator.

12. The system of claim 1, wherein the visual indicator is configured to attract user interaction.

13. A visual indication presentation and interaction processing method executed by a data processing device system communicatively connected to a processor-accessible memory device system and an input-output device system, the method comprising:

receiving, via a communications network and the input-output device system, from a first device system, a first indication of observable presentation of a visual indicator, the first indication consistent with origination from a content monitoring program detecting observable presentation of the visual indicator via monitoring of device-presented content by the content monitoring program;

determining particular content associated with the received first indication of observable presentation of the visual indicator;

storing, in the processor-accessible memory device system and in response to determining that the particular content is associated with the received first indication of observable presentation of the visual indicator, a recorded-presentation indication indicating that the particular content or information associated therewith has been device-presented;

receiving, via the communications network and the input-output device system, from a second device system, a second indication of a user interaction with the visual indicator, the second indication consistent with origination from a different program distinct from the content monitoring program, the second device system distinct from the first device system;

determining that the particular content is associated with the received second indication of the user interaction with the visual indicator; and storing, in the processor-accessible memory device system and in response to determining that the particular content is associated with the received second indication of the user interaction with the visual indicator, an interaction indication that the particular content has been interacted with by a user, wherein the observable presentation of the visual indicator is a first observable presentation of the visual indicator, and wherein the second device system is configured by the different program at least to analyze an image of the visual indicator captured by a camera system of the second device system, the image including a second observable presentation of the visual indicator.

14. One or more non-transitory computer-readable storage mediums storing a program executable by one or more data processing devices of a data processing device system communicatively connected to an input-output device system and a communications network, the program comprising:

first reception instructions configured to cause reception, via the communications network and the input-output device system, from a first device system, of a first indication of observable presentation of a visual indicator, the first indication consistent with origination from a content monitoring program detecting observable presentation of the visual indicator via monitoring of device-presented content by the content monitoring program;

first determination instructions configured to cause a determination of particular content associated with the received first indication of observable presentation of the visual indicator;

first storage instructions configured to cause storage, in a processor-accessible memory device system and in response to determining that the particular content is associated with the received first indication of observable presentation of the visual indicator, of a recorded-presentation indication indicating that the particular content or information associated therewith has been device-presented;

second reception instructions configured to cause reception, via the communications network and the input-output device system, from a second device system, of a second indication of a user interaction with the visual indicator, the second indication consistent with origination from a different program distinct from the content monitoring program, the second device system distinct from the first device system;

second determination instructions configured to cause a determination that the particular content is associated with the received second indication of the user interaction with the visual indicator; and second storage instructions configured to cause storage, in the processor-accessible memory device system and in response to determining that the particular content is associated with the received second indication of the user interaction with the visual indicator, of an interaction indication that the particular content has been interacted with by a user, wherein the observable presentation of the visual indicator is a first observable presentation of the visual indicator, and wherein the second device system is configured by the different program at least to analyze an image of the visual indicator captured by a camera system of the second device system, the image including a second observable presentation of the visual indicator.

\* \* \* \* \*